United States Patent
Hwang

(10) Patent No.: US 11,175,133 B2
(45) Date of Patent: Nov. 16, 2021

(54) SURFACE SLOPE MEASURING DEVICE AND MEASURING OF IDENTIFYING A SURFACE SLOPE THEREOF

(71) Applicant: J-MEX Inc., Hsinchu (TW)

(72) Inventor: Deng-Huei Hwang, Hsinchu (TW)

(73) Assignee: J-MEX INC., Hsinchu (TW)

( * ) Notice: Subject to any disclaimer, the term of this patent is extended or adjusted under 35 U.S.C. 154(b) by 325 days.

(21) Appl. No.: 16/451,344

(22) Filed: Jun. 25, 2019

(65) Prior Publication Data

US 2019/0390958 A1 Dec. 26, 2019

(30) Foreign Application Priority Data

Jun. 26, 2018 (TW) ................... 107121959

(51) Int. Cl.
*G01C 9/32* (2006.01)
*G01C 9/34* (2006.01)

(52) U.S. Cl.
CPC ................ *G01C 9/34* (2013.01); *G01C 9/32* (2013.01)

(58) Field of Classification Search
CPC ........................................................ G01C 9/32
USPC .................................................. 33/348, 348.2
See application file for complete search history.

(56) References Cited

U.S. PATENT DOCUMENTS

| | | | |
|---|---|---|---|
| 4,484,393 A * | 11/1984 | LaFreniere | G01C 9/32 33/348.2 |
| 4,625,423 A | 12/1986 | Sackett | |
| 5,031,329 A | 7/1991 | Smallidge | |
| 6,343,422 B1 | 2/2002 | Takahashi | |
| 6,611,783 B2 | 8/2003 | Kelly | |
| 6,647,634 B2 * | 11/2003 | Yang | G01C 9/32 33/366.16 |
| 6,681,494 B1 * | 1/2004 | Bowden | G01C 9/24 33/379 |
| 6,978,569 B2 | 12/2005 | Williamson | |
| 7,743,520 B1 * | 6/2010 | Jiorle | G01C 9/28 33/366.11 |
| 8,359,757 B1 | 1/2013 | Ruys | |
| 9,366,532 B2 | 6/2016 | Meadows | |
| 2002/0189116 A1 | 12/2002 | Yang | |
| 2007/0169362 A1 * | 7/2007 | Perchak | G01C 9/26 33/366.16 |
| 2009/0235544 A1 * | 9/2009 | Spaulding | G01C 9/26 33/301 |
| 2009/0293297 A1 * | 12/2009 | Roemhild | G01C 9/06 33/366.16 |
| 2011/0119938 A1 | 5/2011 | Kildevaeld | |
| 2013/0091717 A1 | 4/2013 | Steele | |
| 2015/0308822 A1 | 10/2015 | Meadows | |

(Continued)

*Primary Examiner* — George B Bennett
(74) *Attorney, Agent, or Firm* — Volpe Koenig

(57) ABSTRACT

A method for identifying a surface slope includes the following steps: A device body with a tilt angle relative to an absolute horizontal plane and associated with a gravity is placed. A plurality of gravity response signals respectively corresponding to a plurality of angles readouts upon sensing the tilt angle are generated. Each of the plurality of gravity response signals is compared with a reference signal one by one to obtain a respective deviation comparison signal. An optical signal having a parameter is emitted according to a magnitude of the respective deviation comparison signal, wherein the parameter and the magnitude have a mathematical relationship therebetween.

20 Claims, 11 Drawing Sheets

(56) References Cited

U.S. PATENT DOCUMENTS

2016/0040989 A1* 2/2016 Wang .................. G01C 9/06
                                              33/301
2016/0138916 A1   5/2016 Neitzell
2017/0003125 A1   1/2017 Chi

* cited by examiner

```
┌─────────────────────────────────────────────┐
│ providing a gravity sensing unit to sense   │
│ a tilt angle of a bubble tube device to     │
│ generate at least one of a plurality of     │──S101
│ gravity signals as function of time, a      │
│ plurality of amplitude signals and a        │
│ plurality of displacement signals.          │
└─────────────────────────────────────────────┘
                      ↓
┌─────────────────────────────────────────────┐
│ processing at least one of the plurality of │
│ gravity signals as function of time, the    │
│ plurality of amplitude signals and the      │
│ plurality of displacement signals to        │
│ generate at least one of a plurality of     │
│ gravity variant values, a plurality of      │──S102
│ amplitude variant values and a plurality of │
│ displacement variant values, wherein at     │
│ least one of the plurality of gravity       │
│ variant values, the plurality of plurality  │
│ of gravity variant values, the plurality of │
│ amplitude variant values and the plurality  │
│ of displacement variant values indicate a   │
│ convergence state.                          │
└─────────────────────────────────────────────┘
                      ↓
┌─────────────────────────────────────────────┐
│ generating a variant correlation driving    │
│ signal depending on the convergence state   │
│ according to at least one of the plurality  │
│ of gravity variant values, the plurality of │──S103
│ amplitude variant values and the plurality  │
│ of displacement variant values.             │
└─────────────────────────────────────────────┘
                      ↓
┌─────────────────────────────────────────────┐
│ emitting an optical signal having one of a  │
│ specific light intensity and a specific     │──S104
│ light frequency in response to the variant  │
│ correlation driving signal.                 │
└─────────────────────────────────────────────┘
                      ↓
┌─────────────────────────────────────────────┐
│ indicating the tilt angle according to one  │──S105
│ of the light intensity and the light        │
│ frequency.                                  │
└─────────────────────────────────────────────┘
```

S10           Fig. 7

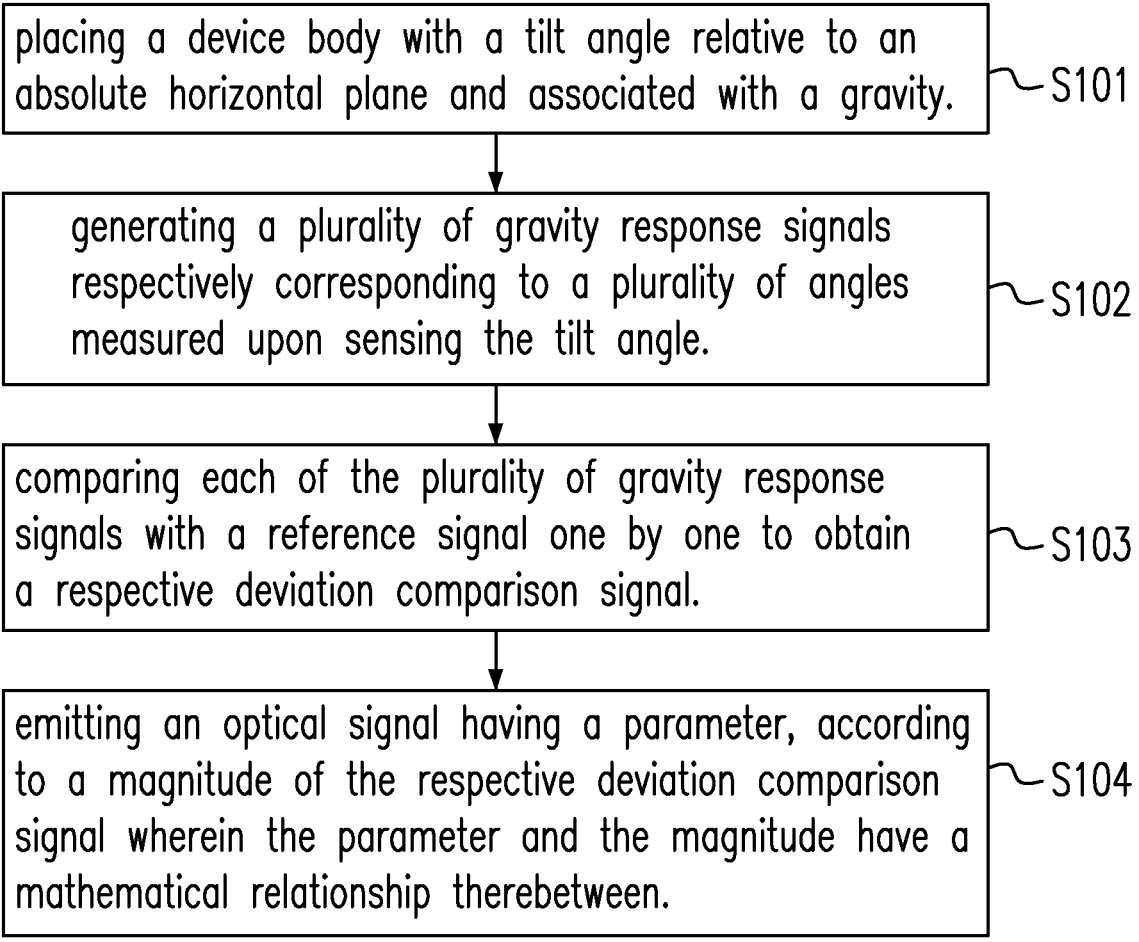
S20  Fig. 8

SURFACE SLOPE MEASURING DEVICE AND MEASURING OF IDENTIFYING A SURFACE SLOPE THEREOF

CROSS REFERENCE TO RELATED APPLICATION

This application claims the benefit of Taiwan's Patent Application No. 107121959, filed on Jun. 26, 2018, at Taiwan's Intellectual Property Office, the disclosures of which are incorporated herein in their entirety by reference.

TECHNICAL FIELD

Embodiments in the present disclosure are related to a surface slope measuring device, and more particularly to a surface slope measuring device having a light source and a method for identifying a surface slope.

BACKGROUND

A traditional bubble level instrument has been widely accepted in the market for a long period of time due to its simple and convenient usage. The benefit of applying the traditional bubble level instrument for measurement is that a user can intuitively and easily realize the horizontal/tilt degree of the measured objects or the measured surface by qualitatively visualizing the floating position of the bubble in the bubble tube or the vial. However, the readout of the traditional bubble level is easily affected by the brightness of the surroundings. When the traditional bubble level instrument is operated in a dim surroundings, it is tiring to keep an eye on the floating position of the air bubbles because the visual image contrast between the bubble and the liquid containing the bubble is not obvious. Furthermore, the most important thing is how to effectively determine the horizontal state of the measured object in various operation circumstances including the dim sourning, especially when the bubble floating position is at the measurement reference point, such as near the horizontal or a specified reference point.

In order to improve the visibility of such a bubble display, an effective way is to illuminate the bubble tube. The patent documents in the prior art include U.S. Pat. Nos. 4,625,423, 8,359,757, 6,343,422 B1, US-2002/0189116 A1, US-2011/0119938 A1, US-2013/0091717, US-2015/0308822 A1, U.S. Pat. No. 9,366,532 B2, US 2016/0138916 A1 and US-2017/0003125 A1, etc., which disclose a technical method whereby illumination is applied to the senssing bubble tube for displaying a measured horizontalness or inclination. U.S. Pat. No. 4,625,423 additionally discloses "as the angle is increased the light transfer is decreased, . . . when the indicatable angle is reached the green LED is extinguished and the red LED representing the indicatable angle is fully illuminated". The technical feature of the patent is that when the measurement angle changes, the light intensity of the projected illumination light also changes accordingly.

Consequently, due to the popularity of micro-electromechanical system sensors, a combination of a micro-electromechanical system acceleration sensor and a traditional bubble level instrument has been developed to measure an angle or a level. By using the acceleration sensor, a signal generated by measuring the angle lights up the light source to illuminate the bubble tube, so that the user can do the angle measurement in an environment with poor brightness. There is also a technical application in the prior art on judging the measurement angle or the level. For example, the technique disclosed in US 2016/0138916 A1 utilizes an acceleration sensor to sense a particular angle, and thereby projects illumination onto the bubble at this particular angle.

However, the prior-art technique disclosed in US 2016/0138916 A1 has a first drawback on measuring the angle by the acceleration sensor and illuminating the bubble tube while the specific angle is measured. The first drawback is that a gradual convergent response signal is not used while the specific angle is measured, and therefore the technique cannot effectively elevate the sensation of the measurement state and the interactive operation experiences for the user. Furthermore, the prior-art technique disclosed in U.S. Pat. No. 4,625,423 has a second drawback concerning the user's subjective awareness determines light intensity corresponding to the change of angle measurement. The second drawback is that an objective measurement function of the angle sensor is not utilized, and the interaction between the angle measurement value and the user's perception of the measurement state is lost.

SUMMARY OF EXEMPLARY EMBODIMENTS

In view of the prior-art drawbacks mentioned above, the present invention provides a surface slope measuring device, which is characterized by setting a first threshold and a second threshold to define a starting time of emitting illumination and the maximum light intensity, and is characterized in that when the acceleration sensor measures a specific angle, the convergence of measured response signal is used define to a set of parameters of a driving signal. The driving signal is used to drive a light source to cause the convergence change of the response signal to correspond to the light intensity of the light source in a proportion relationship. For example, the proportion relationship is a direct proportion relationship or an inverse proportion relationship. The light source is used to prompt the user to perceive the measurement progress and an interactive recognition of the conducted measure operations and the related measurement states to increase the recognition of the measured results.

The acceleration sensing structure of the acceleration sensor is theoretically a mechanical second-order system including a proof mass object and a resilience member, such as a spring; however, in addition to the proof mass object and the spring, its practical structure further includes a damper. In response to an acceleration or an external force applied on the mass-spring mechanical system, the proof mass object is passively moved due to its inertial against to the applied acceleration, and initiated a displacement or an oscillation amplitude, which will converge gradually due to the damping effect of the damper having a damping coefficient or a damp ratio. When a level measurement or an angle measurement is performed, i.e., no external force is applied, a new static equilibrium point corresponding to a gravity component is sensed by the proof mass object, wherein the gravity component results from the measured angle related to the gravity direction causes the proof mass object of the mechanical second-order system to get the new static equilibrium point. During the response process where the proof mass block of the system reaches a displacement or an amplitude change related to a new stable equilibrium point, the convergence of the response process associated with the system mass is presented by a phenomenon whereby the displacement or the amplitude is gradually decreased with time due to the damping effect. The gradual decrease of the displacement or the amplitude is an available physical quantity related to the new equilibrium position of the proof mass object, and the corresponding new equilibrium position is correlated with a measured tilt angle, and the measured result is a horizontal state or a measured angle while the level measurement or the angle measurement is performed.

In order to utilize or display an angle measurement value corresponding to the displacement of the proof mass, a statistic algorithm is often used to process a displacement signal or an amplitude signal associated with the displacement. The purpose of this process is to exclude the measurement value from a static or a dynamic noise interference occasionally introduced into the measurement process, where the noise are caused by an uncertain situation in the environment at which the acceleration sensor is located. The displacement signal is processed by using this statistic algorithm to form a processed displacement signal. The variant values of the correlated signal associated with the processed displacement signal will also converge according to convergence of the displacement variant amount, and the final measured angle value is displayed or the horizontal state is reported until a variance or the variant value of the correlated signal meets the requirement of the designated-convergent threshold value.

The relevant parameters of the driving signal are related to the convergent change of the displacement or the convergent variation of the signal variation. For example, a duty cycle of a PWM driving signal is associated with the convergent displacement change, a relative or an absolute convergent variation amount of the convergent signal variation amount, or a convergent variation amount, so that the PWM driving signal drives the light source to emit a light having a light intensity associated with the relative or absolute convergent variation amount or the convergent variation amount of the convergent signal variation amount. Alternatively, the duty cycle of the PWM driving signal is related to the displacement convergent change, the relative/absolute convergent change rate of the convergent variation rate of the signal variation amount or a variation convergent change rate, so that the PWM driving signal drives the light source to emit a light having a light intensity associated with this relative or absolute convergent change rate or the variation convergent change rate.

Furthermore, in some embodiments, pulse numbers of a PDM driving signal in one cycle are associated with a relative/absolute convergent change amount of the convergent change of the signal variation or the variation convergent change amount, so that the PDM driving signal drives the light source to emit a light having a light intensity associated with this relative or absolute convergent change amount or the variance convergent change amount. Alternatively, pulse numbers of the PDM driving signal in one cycle are associated with a relative/absolute convergent change rate of the convergent change of the signal variation or the variation convergent change rate, so that the PDM driving signal drives the light source to emit a light having a light intensity associated with this relative or absolute convergent change rate or the variance variation convergent change rate, or the statistical variation convergent change rate.

In the present disclosure, the displacement or amplitude convergence change or a signal variation amount associated with the displacement or amplitude convergence change is correspondingly transformed into a driving signal. For example, a pulse width modulation (PWM) signal or a pulse density modulation (PDM) signal is used to drive a light source to illuminate to indicate the corresponding measurement state.

In accordance with one embodiment of the present disclosure, a surface slope measuring device is disclosed, comprising a frame and a bubble tube device. The frame has at least one flat surface for contacting a surface to be measured, and the bubble tube device is coupled to the frame, and comprising a gravity sensing unit, a bubble tube unit, a processing unit and a light source. The gravity sensing unit senses a metric angle of the measured surface to generate a gravity response signal. The bubble tube unit comprises a transparent tube containing a liquid, and a bubble having a position reflecting the metric angle. The processing unit is electrically connected to the gravity sensing unit, processes the gravity response signal to generate a gravity value having a variation value, and processes the gravity value by using a correlation algorithm to output a driving signal according to the variation value. The light source unit is disposed near the bubble tube unit, and emits an optical signal to illuminate the bubble tube unit according to the driving signal.

In accordance with one embodiment of the present disclosure, a method for identifying a surface slope is disclosed, comprising steps of: placing a device body with a tilt angle relative to an absolute horizontal plane and associated with a gravity; generating a plurality of gravity response signals respectively corresponding to a plurality of angles readouts during the convergent period of the amplitude of the proof mass object of the sensing unit upon sensing the tilt angle; comparing each of the plurality of gravity response signals with a reference signal one by one to obtain a respective deviation comparison signal; and emitting an optical signal having a parameter, according to a magnitude of the respective deviation comparison signal wherein the parameter and the magnitude have a mathematical relationship therebetween.

In accordance with a further embodiment of the present disclosure, a surface slope measuring device is disclosed, comprising a device body, a gravity sensing unit, a processing unit and a light source unit. The device body has a tilt angle relative to an absolute horizontal plane and associated with a gravity. The gravity sensing unit generates a plurality of gravity response signals respectively corresponding to plurality of angles readouts upon sensing the tilt angle. The processing unit is electrically connected to the gravity sensing unit, converts the plurality of gravity response signals into a plurality of parameter values, and compares each of the plurality of parameter values with a reference value one by one to obtain a respective deviation comparison value. The light source unit emits an optical signal having a signal parameter according to the respective deviation comparison value wherein the signal parameter and the respective deviation comparison value have a proportional relationship therebetween.

The above embodiments and advantages of the present invention will become more readily apparent to those ordinarily skilled in the art after reviewing the following detailed descriptions and accompanying drawings.

BRIEF DESCRIPTION OF THE DRAWINGS

FIG. 7 is a schematic diagram showing a method of measuring surface slope according to a preferred embodiment of the present disclosure; and FIG. 8 is a schematic diagram showing a method of measuring surface slope according to another preferred embodiment of the present disclosure.

DETAILED DESCRIPTION OF THE PREFERRED EMBODIMENTS

Please refer to all Figures of the present invention when reading the following detailed description, wherein all Figs. of the present invention demonstrate different embodiments of the present invention by showing examples, and help the skilled person in the art to understand how to implement the present invention. However, the practical arrangements and the present method provided to implement the present invention are not necessary to completely comply with the descriptions in the specification. The present examples provide sufficient embodiments to demonstrate the spirit of the present invention, each embodiment does not conflict with the others, and new embodiments can be implemented through an arbitrary combination thereof, i.e., the present invention is not restricted to the embodiments disclosed in the present specification.

Figure 1A:
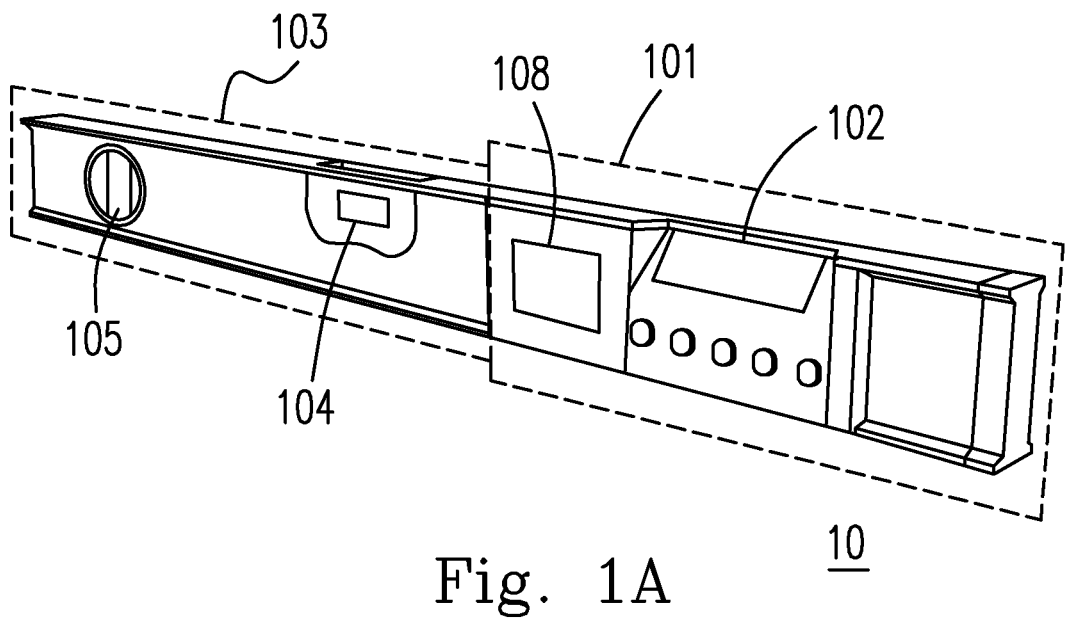
FIG. 1A is a schematic diagram showing a 3D view of the level according to a preferred embodiment of the present disclosure.
Figure 1B:
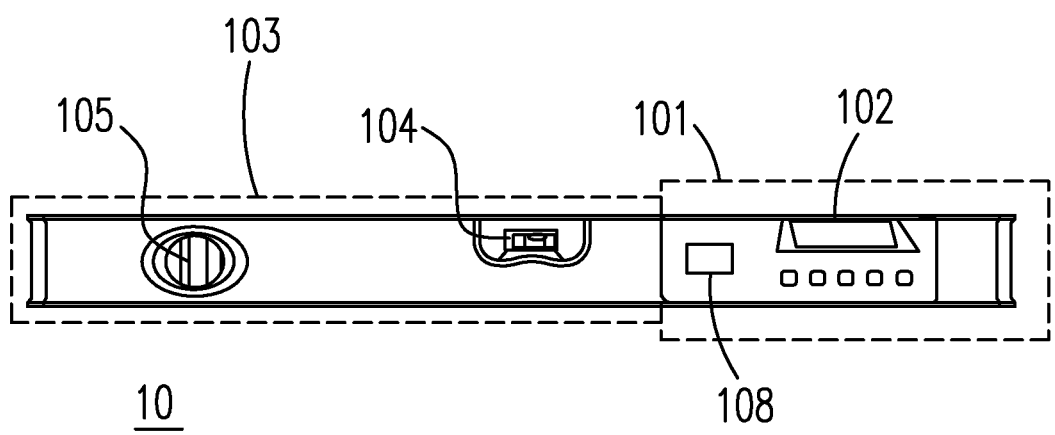
FIG. 1B is a schematic diagram showing a front view of the level according to a preferred embodiment of the present disclosure.
Figure 1C:
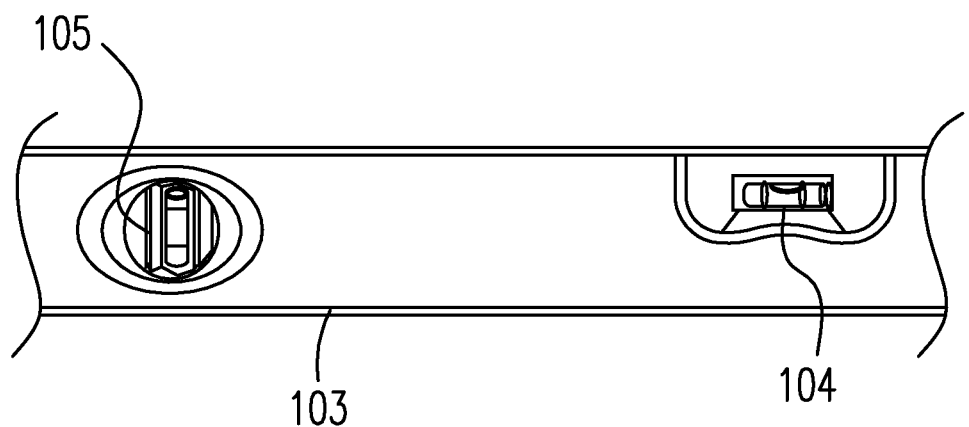
FIG. 1C is a schematic diagram showing an enlarged view of a bubble tube unit of the level according to a preferred embodiment of the present disclosure.
Figure 1D:
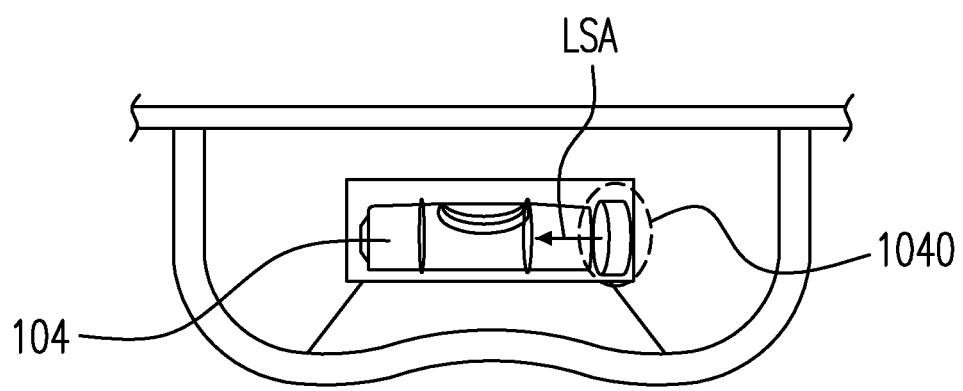
FIG. 1D is a schematic diagram showing a horizontal bubble tube of the level according to a preferred embodiment of the present disclosure.
Figure 1E:
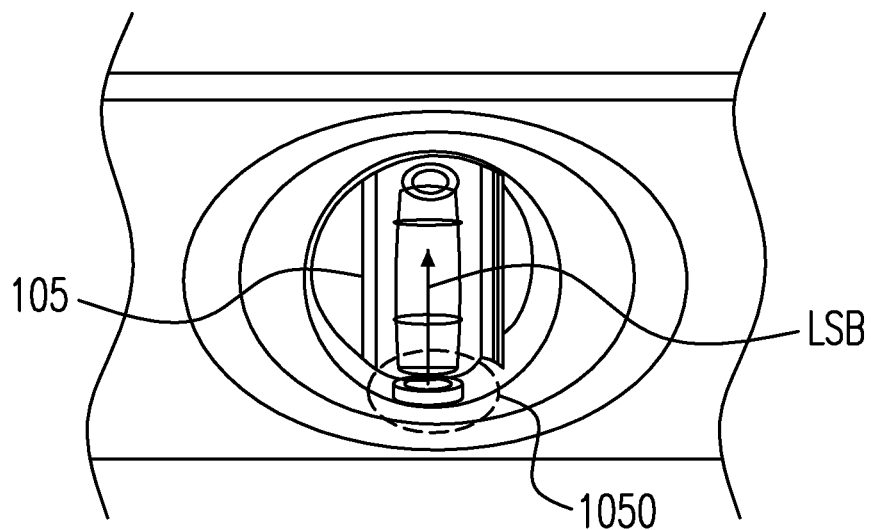
FIG. 1E is a schematic diagram showing a vertical bubble tube of the level according to a preferred embodiment of the present disclosure.
Figure 1F:
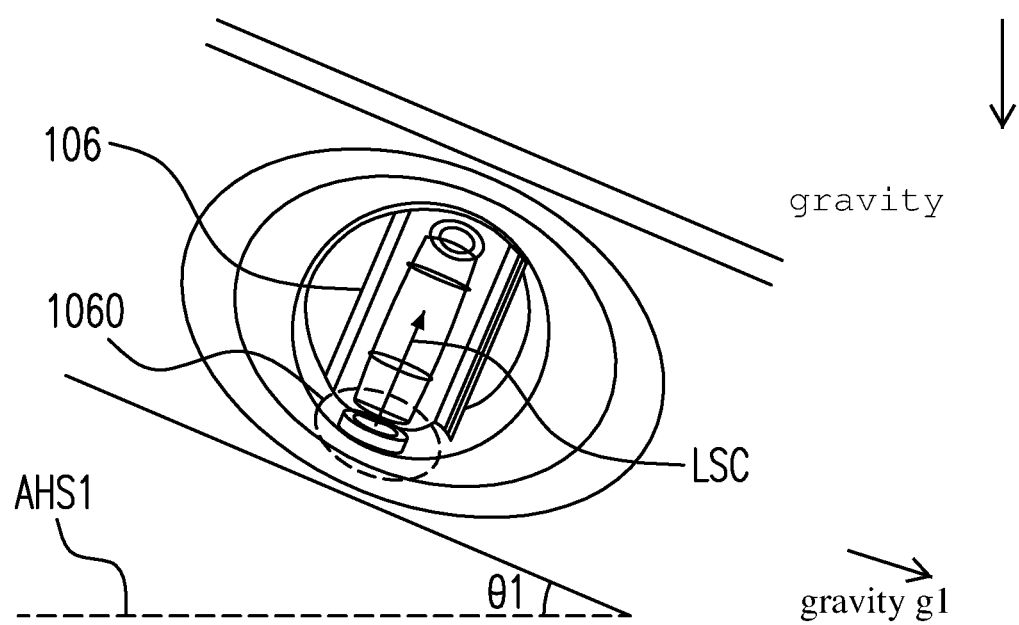
FIG. 1F is a schematic diagram showing any angle bubble tube of the level according to a preferred embodiment of the present disclosure.
Figure 1G:
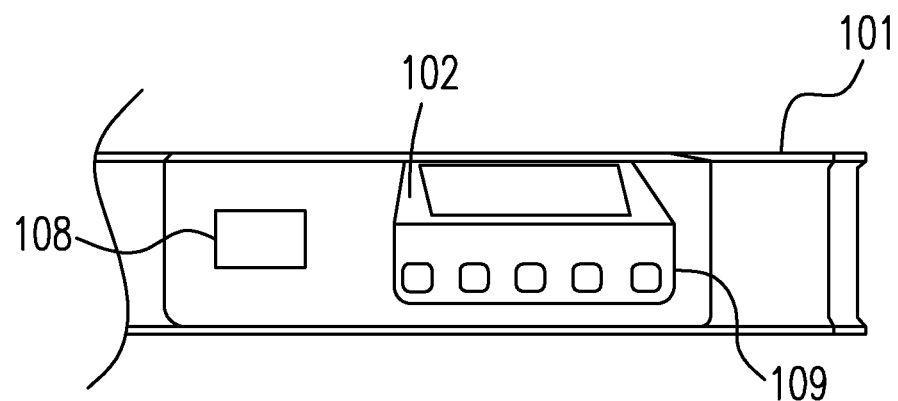
FIG. 1G is a schematic diagram showing gravity sensing and digital angle display according to a preferred embodiment of the present invention.

Please refer to FIGS. 1A-1G FIG. 1A is a schematic diagram showing a 3D view of a level 10 according to a preferred embodiment of the present disclosure. FIG. 1B is a schematic diagram showing a front view of the level 10 according to a preferred embodiment of the present disclosure. FIG. 1C is a schematic diagram showing an enlarged view of a bubble tube unit 103 of the level 10 according to a preferred embodiment of the present disclosure. FIG. 1D is a schematic diagram showing a horizontal bubble tube 104 of the level 10 according to a preferred embodiment of the present disclosure. FIG. 1E is a schematic diagram showing a vertical bubble tube 105 of the level 10 according to a preferred embodiment of the present disclosure. FIG. 1F is a schematic diagram showing any angle bubble tube 106 of the level 10 according to a preferred embodiment of the present disclosure. FIG. 1G is a schematic diagram showing gravity sensing and digital angle display according to a preferred embodiment of the present invention.

In FIG. 1A, the level 10 includes a gravity sensing unit 101 having an indicator 102. For example, the indicator 102 is a display device, and indicates a tilt angle θ1 relative to an absolute horizontal plane AHS1 and associated with a gravity as shown in FIG. 1F. The level 10 includes a bubble tube unit 103, which includes a horizontal bubble tube 104 and a vertical bubble tube 105. The level 10 further includes light source units 1040, 1050 and 1060 respectively disposed near the horizontal bubble tube 104, a vertical bubble tube 105 and any angle bubble tube 106, so that the light source units 1040, 1050 and 1060 can respectively illuminate the horizontal bubble tube 104, the vertical bubble tube 105 and the any angle bubble tube 106. In FIG. 1G, the gravity sensing unit 101 includes a setting button 107 (not shown) for setting the level 10 to have a function that the light source units 1040, 1050 and 1060 start to respectively emit optical signals (as LSA, LSB, LSC shown in Figs. D, E, F respectively) when the level 10 reaches a predetermined tilt angle, in order to illuminate the horizontal bubble tube 104, the vertical bubble tube 105 and the any angle bubble tube 106 respectively. The gravity sensing unit 101 can include a processing unit 108, and can be disposed near the bubble tube unit 103. The optical signals LSA, LSB and LSC include a single optical frequency or a mixed optical frequency, wherein the single optical frequency is related to a light intensity, and the mixed optical frequency is mixed from the optical frequencies of three primary colors of light. Each of the light source units 1040, 1050 and 1060 includes one of a single color LED and a full color LED with three primary colors of red, blue and yellow.

Figure 2:
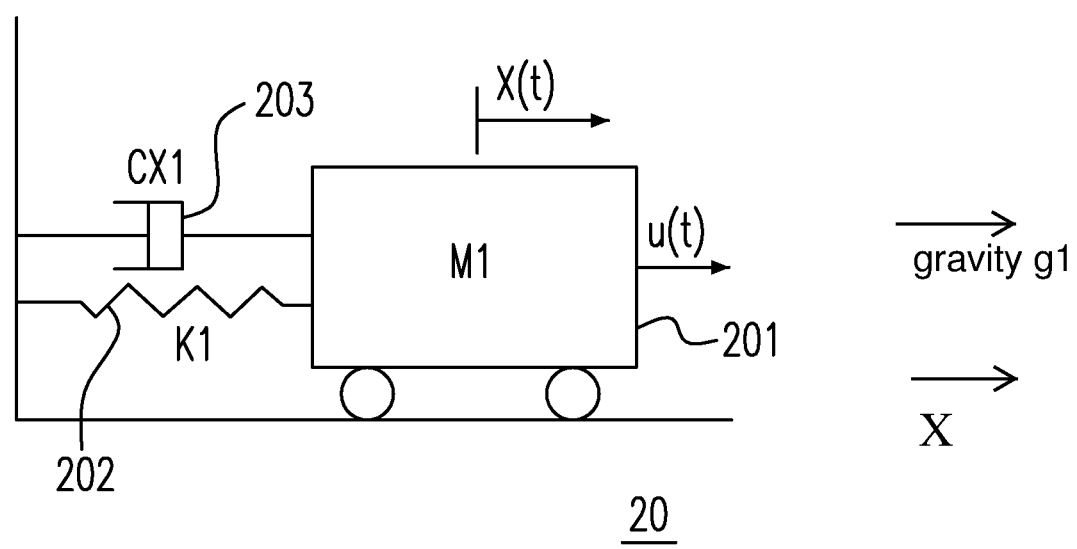
FIG. 2 is a schematic diagram showing a sensing mechanism—a $2^{nd}$—order Mechanical System associated with an acceleration sensor according to a preferred embodiment of the present disclosure.

Please refer to FIG. 2, which is a schematic diagram showing a sensing mechanism—a $2^{nd}$—order Mechanical System associated with an acceleration sensor 20 according to a preferred embodiment of the present disclosure. The acceleration sensor 20 can be disposed in the gravity sensing unit 101 or disposed near the bubble tube unit 103, and is used to precisely measure the tilt angle θ1 to display digits indicating the measured tile angle on the indicator 102. The bubble tube unit 103 can be used to roughly detect a degree of the tilt angle θ1, and the light source unit (1040, 1050 or 1060) can transmit or project a light to illuminate the bubble tube unit 103. Specifically, in the present invention, the response of the gravity sensing unit 101 can be used to correspondingly generate a driving signal for the light source unit. As shown in FIG. 2, in response to the convergent movement X(t) of the proof mass object M1 approaching to a new equilibrium point relevant to a predetermined tile angle θ1, the driving signal can be interactively to the convergent movement to cause a brightness or a color of the light to change to emphasize the new position of the bubble in the bubble tube unit 103 to indicate the measurement of the predetermined tile angle θ1, so as to prompt a user to recognize whether the predetermined tilt angle θ1 has approached or not. Therefore, this process has remarkable benefits for the user to intuitively to realize the measurement state. In FIG. 2, the acceleration sensor 20 includes a mass block 201 having a proof mass M1, a spring 202 having an elastic coefficient K1, and a damper 203 having a damping coefficient CX1. The equivalent sensing mechanism serves as a second order mechanical system, and is associated with X(t) and u(t). X(t) represents a displacement in which a component u(t) of a gravity acceleration related to the measured tile angle θ1 causes the mass block 201 to move along X direction. The equation of motion of the mass block 201 (having the proof mass M1) is expressed as the following equation Eq1:

$$M1X''(t)+C1X'(t)+K1X(t)=u(t) \quad (Eq1)$$

X(t) represents the displacement or the amplitude of the mass block 201.

Figure 3A:
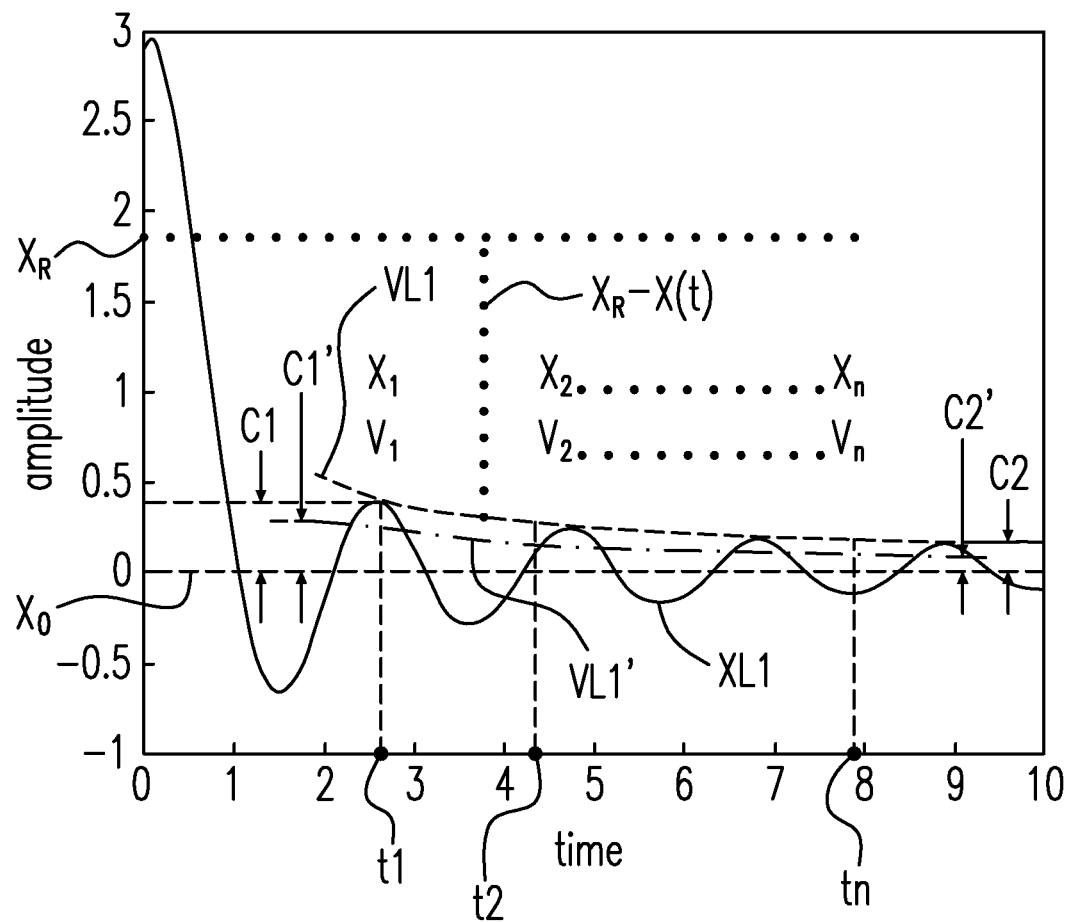
FIG. 3A is a schematic diagram showing an amplitude or a displacement response of a proof mass as a function of time according to a preferred embodiment of the present disclosure.

Please refer to FIG. 3A, which is a schematic diagram showing an amplitude or a displacement response X(t) of a mass block 201 as a function of time according to a preferred embodiment of the present disclosure. The mass block 201 has a proof mass. When the acceleration sensor measures a tilt angle θ1, the mass block 201 is transferred from a reference equilibrium point $X_R$ to a new equilibrium point $X_0$, wherein the reference equilibrium point $X_R$ corresponds to a horizontal state $L_R$ or a specific angle $θ_R$ (not shown), and the new equilibrium point $X_0$ corresponds to the measured tilt angle θ1. The horizontal axis represents time; the vertical axis represents amplitude; and XL1 shown by a curve represents the displacement or the amplitude variant as a function of time. When a new equilibrium point serves as a base point, the mass block 201 corresponds to a measured tilt angle θ1, and performs the displacement or the amplitude variant as a function of time. As shown in FIG. 3A, VL1 shown by a curve represents an envelope (or envelope trace) of the XL1 (the displacement or the amplitude variant) as function of time. In view of the VL1, the amplitude X(t) is varied to form X(t1)=X1, X(t2)=X2, . . . , X(tn)=Xn, and X1, X2, . . . Xn show a gradual convergence state, i.e., X1>X2>X3> . . . >Xn, where XM represents magnitude of the amplitude X(t), i.e., the absolute value of X(t). In addition, the definition of an absolute amplitude variation amount refers to the variation amount between X1 and Xn, i.e., X1-X2, X1-X3, . . . , X1-Xn, and the absolute amplitude variation amount sequence has a characteristic that the absolute amplitude variation amount increases gradually. There is a first difference between X1 and Xn; and the absolute amplitude variation ratio is defined by the ratio of the first difference to X1. In other words, the ratio of the absolute amplitude variation amount to X1 is represented by XMa, where XMa=||X1|-|Xn||/X1, and the absolute amplitude variation ratio XMa forms a gradually enlarged sequence. In addition, the relative amplitude variation amount is an amount of change between Xn-1 and Xn, that is, X1-X2, X2-X3, . . . , Xn-1-Xn, and the variation trend of the sequence is gradually enlarged or reduced. There is a second difference between the adjacent amplitudes Xn-1 and Xn respectively sampled at adjacent sampling time points; and a relative amplitude variation ratio is defined by the second difference to Xn-1. In other words, the ratio of the relative amplitude variation amount to Xn-1 is represented by XMr, wherein XMr=||Xn-1|-|Xn| |/Xn-1, and this change trends of the relative amplitude variation ratio are convergent or gradually enlarged. Furthermore, similar to the above-described absolute amplitude variation, the difference between the original equilibrium point $X_R$ and the amplitude variation amount X(t) with respect to the new equilibrium point X0 is gradually enlarged, that is, $X_R$–X1, $X_R$–X2, . . . , $X_R$–Xn, i.e., $X_R$–X(t) is also gradually enlarged.

VL1' is a trend of a variation over time, which indicates the displacement or the displacement variation of the mass 201 of the acceleration sensor 20 with respect to an expected value. Alternatively, VL1' can be a trend of another variation over time, which indicates the magnitude change of the amplitude X(t) during the angle measurement, wherein the magnitude of variation amount V(t) of the amplitude X(t) is related to the expected value e.g. the new equilibrium point X0 of the mass block 201 along with time change during the angular measurement. That is, VL1' indicates the variation V(t) along with time change, and VL1' also has a similar convergence trend with this envelope VL1. In FIG. 3A, it can be seen that the variations V(t1)=V1, V(t2)=V2 . . . , V(tn)=Vn are also a gradual convergent trend, that is, V1>V2>V3> . . . >Vn, where VM represents the magnitude of the variation V(t), which is the absolute value of V(t). The change amount of the absolute variation amount is defined by the change amount between V1 and Vn on VL1', i.e., V1-V2, V1-V3, . . . , V1-Vn, the change amount sequence formed by the absolute variations is enlarged gradually. In addition, the absolute variation change ratio is defined by the difference between the change amount of V1 and Vn on VL1' (i.e., the change amount of the absolute variation) with respect to variation amount V1, represented as VMa, wherein VMa=||V1|-|Vn||/V1, n=2, 3, 4, . . . , and VMa is a gradual enlarged sequence. The relative variation ratio refers to the difference between the adjacent sampling points Vn-1 and Vn on VL1'(i.e., the relative variation amount) with respect to the variation amount Vn-1, represented by VMr, wherein VMr=||Vn-1|-|Vn||/Vn-1, n=2, 3, 4, . . . , VMr can be a sequence that gradually converges, gradually enlarges, or the sequence has sequential values that are approximately equal or interleaved-.

Figure 3B:
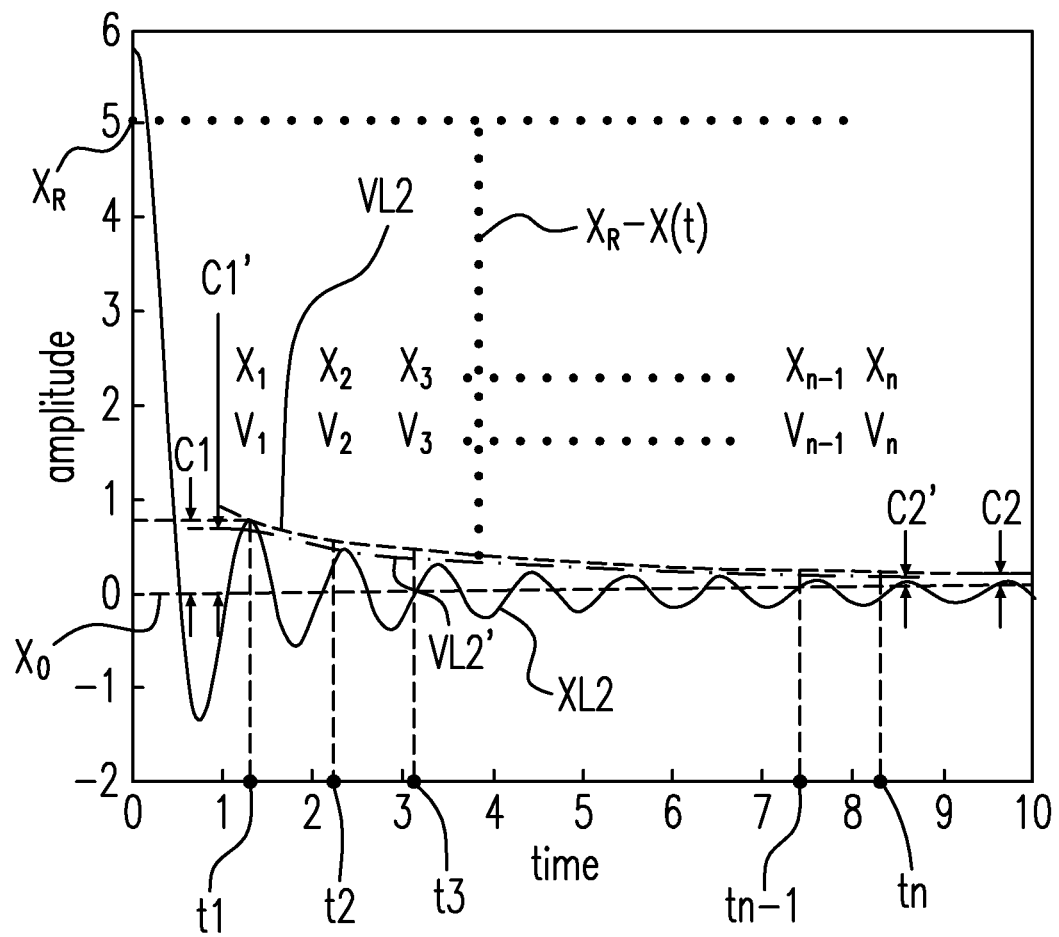
FIG. 3B is a schematic diagram showing an amplitude or a displacement response of a proof mass as a function of time according to a preferred embodiment of the present disclosure.

Please refer to FIG. 3B, which is a schematic diagram showing an amplitude or a displacement response X(t) of a mass block 201 over time according to a preferred embodiment of the present disclosure. The mass block 201 has the proof mass M1 over time. When the acceleration sensor measures a tilt angle θ1, the mass block 201 is transferred from a reference equilibrium point $X_R$ to a new equilibrium point $X_0$, wherein the reference equilibrium point $X_R$ corresponds to a horizontal state $L_R$ (not shown) or a specific angle $θ_R$ (not shown), and the new equilibrium point $X_0$ corresponds to the measured tilt angle θ1 (as shown in FIG. 1F). The horizontal axis represents time, the vertical axis represents amplitude, and XL2 represents a displacement or amplitude variation curve over time related to a new equilibrium point X0, a new reference point, corresponding to the measured tilt angle θ1 for the mass block 201. VL2 represents the envelope trace or envelope of the XL2 curve over time. Please refer to VL2 representing an absolute amplitude change rate. The absolute amplitude change rate is a change rate of the difference between X1 and Xn with respect to the time difference between two time points at which the two data X1 and Xn are respectively picked up, represented by XRa, wherein XRa=||Xn|-|X1||/(tn-t1), n=2, 3, 4, . . . . The relative amplitude change rate is a change rate of the difference between Xn and Xn-1 with respect to the time difference between the two adjacent sampling time points, represented by XRr, wherein XRr=||Xn|-|Xn-1||/($t_n$-$t_n$-1), n=2, 3, 4, . . . . Each of XRa and XRr can be a sequence having sequential values that are gradually convergent, gradually enlarged, approximately equal or numerically interleaved. The VL2' is used to indicate a trend of a variation V(t) over time during the angle measurement. The displacement of the mass 201 of the acceleration sensor 20 or the magnitude of the amplitude X(t) corresponds to an expected value, such as a new equilibrium point X0. That is, VL2' indicates the change of the variation V(t) over time, and VL2' also has a convergence trend similar to this envelope VL2. Please refer to VL2' representing an absolute variation rate. The absolute variation rate is a change rate of the difference between V1 and Vn with respect to the time interval between two time points at which the two data V1 and Vn are respectively picked up, expressed as VRa, where VRa=||Vn|−|V1||/(tn−t1), n=2, 3, 4, . . . The relative variation rate is a change rate of the difference between adjacent sampling data values Vn−1 and Vn on VL2' with respect to the time difference between two adjacent sampling time points, expressed as VRr, where VRr=||Vn|−|Vn−1||/(tn−tn−1), n=2, 3, 4, . . . . Each of the Vra, and the VRr can be a sequence having numerical values that are gradually convergent, gradually enlarged, approximately equal or numerically interleaved. In FIG. 3B, it can be seen that there is the amplitude sequence (X(t1)=X1, X(t2)=X2 . . . ), and X(tn)=Xn is converged over time. There is the relative value sequence (X1-X2, X1-X3, . . . , X1-Xn or 1/X1, 1/X2, . . . 1/Xn), i.e. 1/X(t) is gradually enlarged. There is a relative value sequence ($X_R$-X1, $X_R$-X2, . . . , $X_R$-Xn), i.e., ($X_R$-X(t)) is also gradually enlarged over time. In addition, there is the variation amount sequence (V(t1)=V1, V(t2)= V2 . . . ), and V(tn)=Vn shown on the variation amount curve VL2' which is convergent over time. On the contrary, there is the relative value sequence (V1-V2, V1-V3, . . . , V1-Vn) or (1/V1, 1/V2, . . . , 1/Vn), i.e., (1/V(t)) is gradually enlarged. There is the relative value sequence ($X_R$-V1, $X_R$-V2, . . . , $X_R$-Vn), i.e., ($X_R$-V(t) is also gradually enlarged.

The convergence rate of the amplitudes and the variations can be known from XRa, XRr, VRa and VRr.

Figure 4A:
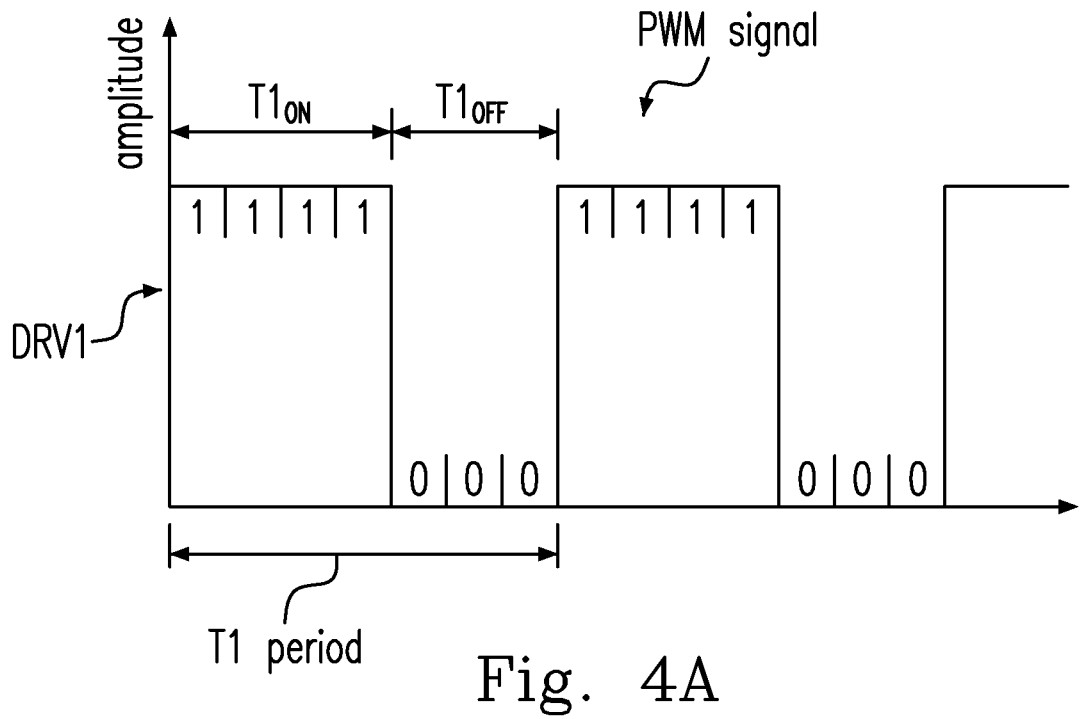
FIG. 4A is a schematic diagram showing an associated PWM signal according to a preferred embodiment of the present disclosure.

Please refer to FIG. 4A, which is a schematic diagram showing an associated signal according to a preferred embodiment of the present invention.

The associated signal can be a Pulse Width Modulation (PWM) signal. Under the predetermined cycle period T1 (Cycle Time/Period), its duty cycle $T1_{ON}$ is related to the amplitude or displacement response X(t) of the mass 201 of the acceleration sensor 20 having the proof mass M1. The present invention allows the ratio of the duty cycle of the PWM signal with respect to the predetermined cycle period T1 or a driving duty cycle (i.e., $T1_{ON}$/T1) to be proportional (or a mathematical relationship) to the following items:

(i) inversely proportional to the absolute value of the amplitude or displacement X(t);

(ii) proportional to the absolute amplitude variation, (ie, the value of X1-X2, X1-X3, . . . , X1-Xn), proportional to the change ratio of absolute amplitude variation XMa=||X1|−|Xn||/X1, proportional to the inverse (1/X1, 1/X2, . . . 1/Xn) of the absolute value of the amplitude or displacement X(t), (i.e., 1/X(t)) proportional to ($X_R$-X(t)) (t)), or proportional to ($X_R$-V(t));

(iii) inversely proportional to the absolute value of the statistical relative variations V(t) of X(t) related to an equilibrium point $X_0$ corresponding to the measured angle;

(iv) proportional to the change amount of the absolute variation, (i.e., V1-V2, V1-V3, . . . , V1-Vn), or proportional to the reciprocal 1/V1, 1/V2, . . . , 1/Vn of the variation V(t)(i.e., 1/V(t)).

Please refer to FIG. 1A, FIGS. 1D-1F, FIG. 3B and FIG. 4A at the same time. The process of indicating the angle measurement to be completed is as follows: When the magnitude XM of the amplitude converges to be no larger than a first threshold value C1, or when the variation amount VM converges to be no larger than a first threshold value C1', that is, when the amplitude X(t) or the variation V(t) converges to no larger than the first threshold value (C1 or C1'), the processing unit 108, in response to the amplitude or the variation value V(t), outputs a driving signal DRV1 (or is called an associated signal) to drive the light source unit 1040, 1050, 1060. That is, a driving power or the driving duty cycle (i.e., $T1_{ON}$/T1) of the driving signal can be inversely proportional to X(t), V(t), X(t) rate or V(t) rate, or can be proportional to 1/X(t), 1/V(t), 1/(X(t) Rate) or 1/(V(t) rate), or can proportional to ($X_R$-X(t)), ($X_R$-V(t)) in order to cause a duty cycle to be correspondingly associated with a ratio, wherein the duty cycle is associated with a predetermined cycle period T1 to form the ratio $T1_{ON}$/T1, the driving duty cycle. That is, when X(t), V(t), X(t) rate or V(t) rate decreases, the driving signal DRV1 having the driving duty cycle output by the processing unit 108 based on the inversely proportional relationship is used to drive the light source unit 1040, 1050, 1060 (for example, mono color LED light source) to emit a light having a relative low intensity at the beginning, and then the relative low intensity increases. Alternatively, the drive signal DRV1 drives a full color LED to emit a series of warm color light at the beginning, wherein the color temperature of the series of warm color light is about 2000° K, and then become blue white (cold color) light spectrum gradually. Alternatively, when 1/X(t), 1/V(t), 1/(X(t) rate), 1/(V(t) rate), ($X_R$-X(t)) or ($X_R$-V(t)) increases, the driving signal DRV1 having the driving duty cycle output by the processing unit 108 based on the proportional relationship is used to drive the light source unit 1040, 1050, 1060 to emit a light having a relative low intensity at the beginning, and then the relative low intensity increases. The driving signal DRV1 includes a plurality of PWM signal to emit a light having three primary colors to indicates the angular measurement has approached a steady value to attract a user to pay attention to the bubble position of the bubble tube 106 at a measured tilt angle. Generally speaking, firstly the processing unit 108 outputs a reference signal (not shown), and then adjusts the reference signal to become the driving signal DRV1 according to X(t), V(t), X(t) rate, V(t) rate, 1/X(t), 1/V(t), 1/(X(t) rate) or 1/(V(t) rate), and the driving signal DRV1 is such as the PWM signal.

In the indicating process during measurements, when the value of the X(t), V(t), X(t) rate or V(t) rate gradually decreases, or when the value of 1/X(t), 1/V(t), 1/(X(t) rate), 1/(V(t) rate), ($X_R$-X(t)) or ($X_R$-V(t)) gradually increases, the duty cycle with respect to the predetermined cycle period, i.e., the ratio $T1_{ON}$/T1, or the driving duty cycle, caused by the processing unit 108 through a correlation algorithm, is gradually incremented. That is, the driving signal DRV1 can drive the light source units 1040, 1050, 1060 (for example, a monochrome LED) to emit the light having a relatively strong, increasing light intensity, or the driving signal DRV1 can drive the light source unit 1040, 1050, 1060 (for example, a full-color LED) to emit a yellow-green spectrum transferring to a cold color spectrum with a color temperature is no less than 4000° K. This can make the bubble tube 104, 105, 106 brighter and brigher, the user can easily see the bubble with respect to the measured angle when the acceleration sensor 20 becomes stable; and when X(t) rate, V(t), X(t) rate or V(t) rate eventually converges to no larger than a defined convergent threshold (C2 or C2'), the duty cycle with respect to the predetermined cycle period, i.e., the ratio $T1_{ON}/T1$, or the driving duty cycle achieves its maximum. That is, the driving signal DRV1 drives the mono color LED to emit the light having the strongest light intensity, or drives the full color LED to emit the light having a blue, white and cold color spectrum having the color temperature—about 8000K, so as to prompt the user that the angular measurement is complete.

Figure 4B:
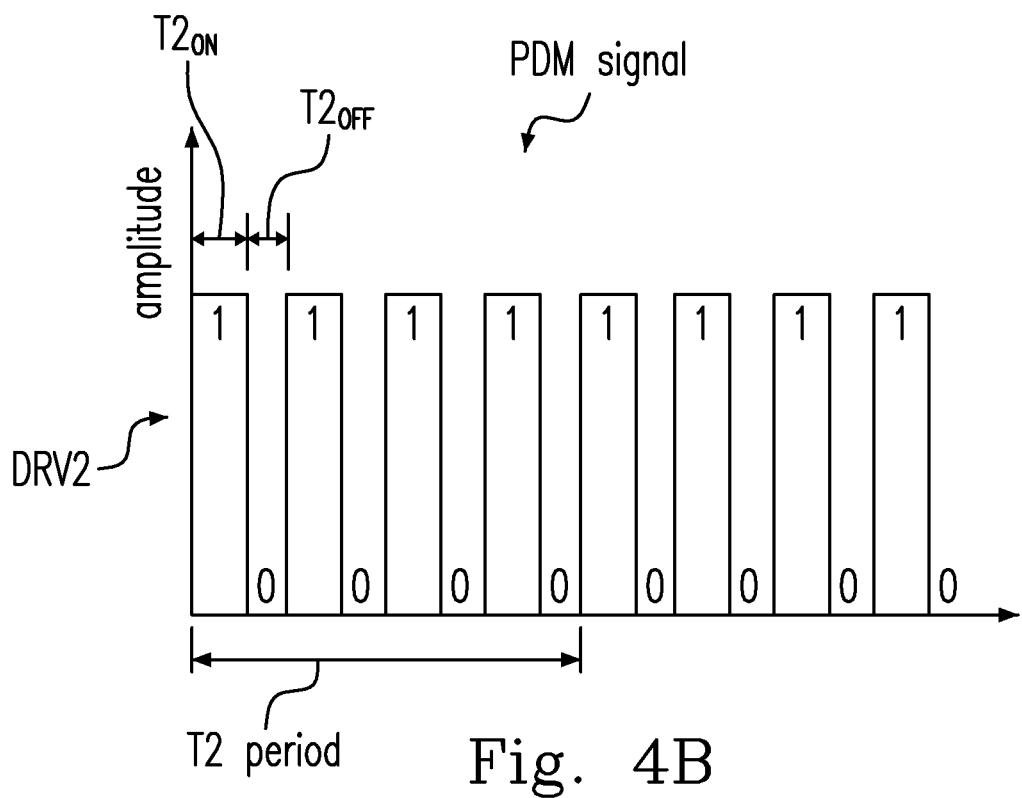
FIG. 4B is a schematic diagram showing an associated PDM signal according to another preferred embodiment of the present disclosure.

Please refer to FIG. 4B, which is a schematic diagram showing an associated signal according to another preferred embodiment of the present invention. The associated signal can be a Pulse Density Modulation (PDM) signal. Under the predetermined cycle period T2 (Cycle Time/Period), the total pulse time of the pulse number N equals ($T2_{ON} \times N$), and a driving duty ratio is defined as the ratio of the total pulse time with respect to the cycle period T2 i.e. ($T2_{ON} \times N \div T2$). The amplitude or displacement X(t) of the mass block 201 having the proof mass M1 in the acceleration sensor 20 is associated with the driving duty ratio, (($T2_{ON} \times N) \div T2$). In general, the processing unit 108 will make the total pulse time relative to the cycle period (i.e., the ratio, ($T2_{ON} \times N) \div T2$) to be in a proportional relationship (or a mathematic relationship) with the following items:

(i) inversely proportional to the absolute value of the amplitude or displacement X(t);

(ii) proportional to the absolute amplitude variation (ie, the value of X1-X2, X1-X3, . . . , X1-Xn), proportional to the ratio of absolute amplitude variation (XMa=||X1|−|Xn||/ X1), or is proportional to the inverse of the absolute value of the amplitude or displacement (X(t), 1/X1, 1/X2, . . . 1/Xn, i.e., 1/X(t)), and proportional to ($X_R$−X(t)), or proportional to ($X_R$−V(t));

(iii) inversely proportional to the absolute value of the statistical relative variation V(t) of X(t) related to an equilibrium point $X_0$ corresponding to the measured angle; and (iv) proportional to the change amount of the absolute variation (i.e., V1-V2, V1-V3, . . . , V1-Vn), or proportional to the reciprocal of the variation V(t) (i.e., 1/V1, 1/V2, . . . , 1/Vn, which is 1/V(t)).

Please refer to FIGS. 1A, 1D-1F, 3B and 4A at the same time. In another preferred embodiment, the process of indicating the angle measurement to be completed is as follows. When the amplitude XM converges to be equal to the first threshold value C1 or when the variance amount VM converges to be equal to the first threshold value C1', that is, at the time that the amplitude X(t) or the variation value V(t) converges to the threshold value (C1 or C1'), the processing unit 108 starts to output a driving signal DRV2 (or an associated signal) to drive the light source units 1040, 1050, 1060 in response to the amplitude X(t) or the variation value V(t). The relatively large X(t), V(t), X(t) rate or V(t) rate corresponds to a relatively small ratio the driving duty ratio, which is associated with the total pulse time with respect to the cycle period, and equals ($T2_{ON} \times N \div T2$). That is, the driving signal DRV2 drives the light source unit 1040, 1050, 1060 (for example, a monochromatic LED light source) to emit the light having a relatively low light intensity, or the driving signal DRV2 drives the full color LED to emit the light having a red/orange warm color spectrum. The driving signal DRV2 includes the plurality of PDM signals to emit a light having the three primary colors, in which the color temperature of the red orange warm color spectrum is about 2000K, indicating that the angle measurement has approached a stable value to remind the user the bubble position of the bubble tube 106 at the specified tilt angle θ1. Generally speaking, the processing unit 108 first outputs a reference signal (not shown), and then adjusts the reference signal to become the driving signal DRV2 according to X(t), V(t), X(t) rate or V(t) rate, and the driving signal DRV2 is the same as the PDM signal.

In the indicating process during measurements, when the X(t), V(t), X(t) rate or V(t) rate decreases, or 1/X(t), 1/V(t), 1/(X(t) rate) 1/(V(t) rate), ($X_R$−X(t)) or ($X_R$−V(t)) is increasing, the ratio of the total pulse time with respect to the cycle period ($T2_{ON} \times N \div T2$), or the driving duty ratio, generated by the processing unit 108 through a correlation algorithm, is gradually increased. That is, the driving signal DRV2 drives the light source unit 1040, 1050, 1060 (for example, a monochrome LED light source) to emit the light having a relatively strong, increasing light intensity, or the driving signal DRV2 drives the light source unit 1040, 1050, 1060 (for example, full-color LED) to emit the light having a yellow-green wavelength (its color temperature is about 4000K) transferring to a cold color wavelength to facilitate the bubble tube 106 becomes brighter and brighter until the X(t), V(t), X(t) rate, or V(t) rate eventually converging to less than or equal to a defined convergence threshold (C2 or C2') (Convergent Threshold: CT), that makes the user easier to see the bubble while measuring the angle When the X(t), V(t), X(t) rate, or V(t) rate are less or equal to the Convergent Threshold: CT, the ratio of the total pulse time to the cycle time ($T2_{ON} \times N \div T2$) is the largest, that is, the driving signal DRV2 drives the monochrome LED light source to emit the strongest light intensity, or drives the full-color LED to emit a blue-white luminescence spectrum light with a color temperature of about 8000K, in order to prompt the user that the angle measurement has been completed. In a preferred embodiment, the total pulse time ($T2_{ON} \times N$), or a single pulse time $T2_{ON}$ can be set or configured according to the startup time or reaction time of the light source the LED. For example, if the reaction time of the LED is short, it's able to increase the number of working pulses in the period T2 to increase the pulse density to enhance the light intensity or accelerate the spectral response of the light source to promote significantly the brightness or the continuity of the light color change or the change rate of the LED, to facilitate the illumination projected to the bubble tube 104, 105, 106 can be adjusted quickly and softly.

The embodiment of adopting a PWM signal or a PDM signal as a driving signal shown that an analog signal can be converted into a precisely controllable digital signal through the processing unit 108. For example, in FIGS. 3A and 3B, the change amplitude X(t), the amount of variation V(t), the rate of X(t) or the rate of V(t) changed according to the gravity (or acceleration) is converted into the duty cycle of the PWM signal ($T1_{ON} \div T1$) or the ratio of the total pulse time with respect to the cycle period=($T2_{ON} \times N \div T2$), so that the light intensity or color temperature used for the indication can be precisely adjusted, allowing the user to intuitively identify the measured tilt angle with accuracy and precision.

Figure 5:
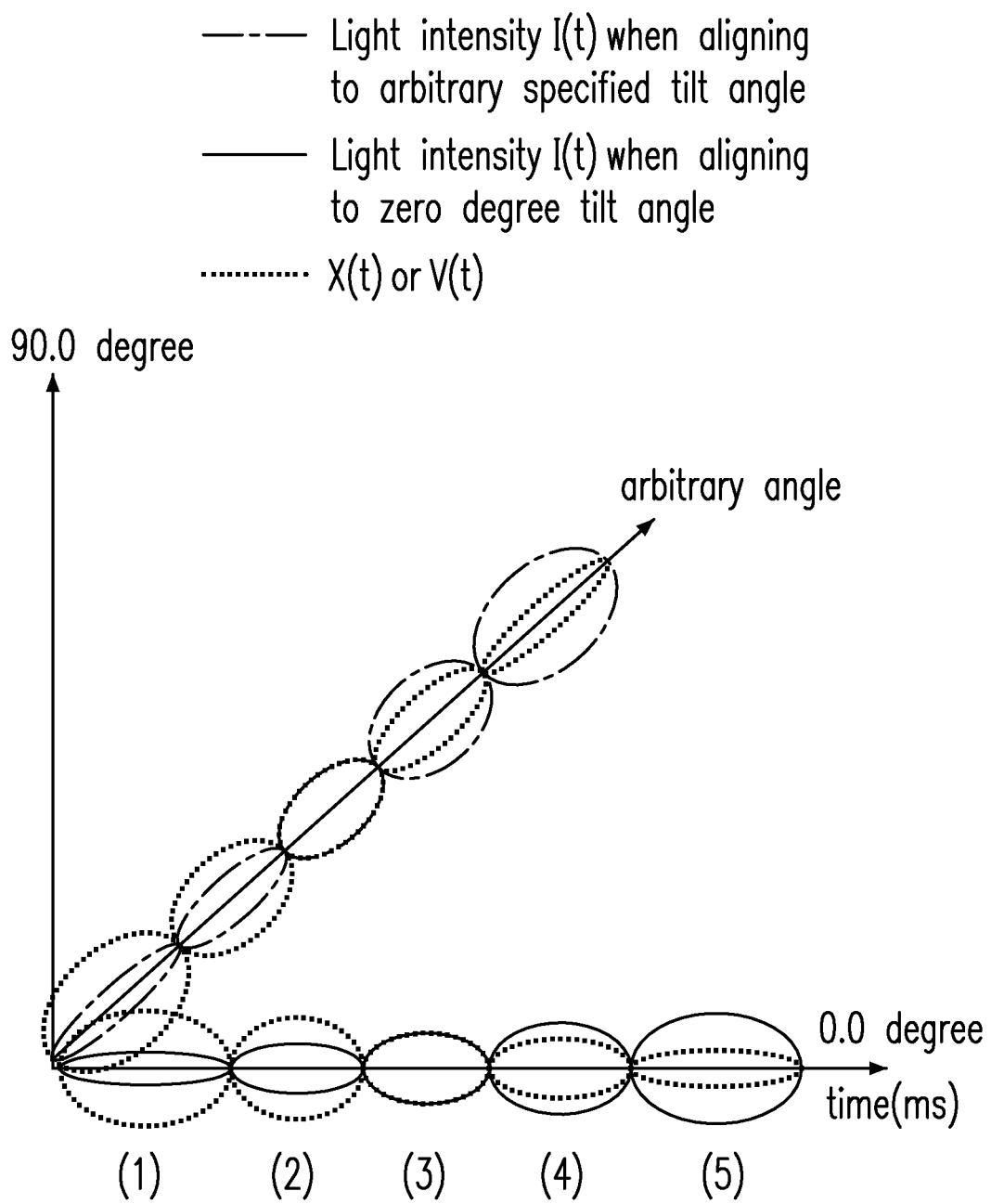
FIG. 5 is a schematic diagram showing the illuminance intensity/color temperature transformations associated with several motion parameters at any angle of a preferred embodiment of the invention.

Please refer to FIG. 5, which is a schematic diagram showing the illumination intensity/color temperature transformations associated with the amplitude X(t), the variation V(t), the X(t) rate, or the V(t) rate at any angle according to a preferred embodiment of the present disclosure. The horizontal axis represents time and the angle at 0 degrees, the time is, for example, in milliseconds, and the vertical axis representing at 90 degrees. The solid line of the ellipse represents the change of the light intensity over time when the alignment tilt angle θ1 is zero degrees, the ellipse having one long and one short dashed line represents the light intensity changes over time when the level 10 aligning to the tilt angle θ1 is a specified angle. The flatter the two ellipses are, the weaker the light intensity, and vice versa. The short dashed ellipse represents the absolute value of the amplitude X(t) or the displacement variation V(t). In FIG. 5, it can be seen that when the short dashed ellipse is not flat (the closer to the circle), the solid ellipse representing the luminous intensity or the ellipse with one long and short dashed line will be flatter, i.e., the light intensity becomes smaller. This represents the magnitude of the amplitude X(t) and variation V(t) is inversely proportional to the light intensity, and vise verse. Taking at 0 degree (0.0 deg) to develop the light intensity as an example, it can be seen as follows: Timing (1): when the magnitude of the amplitude X(t) or the displacement variation V(t) meets the first threshold C1 or C1' of initialing the illumination indication, the light source unit 1040 emits the weakest light intensity, 41). During time sequences (2), (3), (4), compared with the decreasing amplitude X(t) or displacement variation V(t), the light source intensity I(2), I(3) to I(4) increase gradually, and the magnitude amplitude X(t) or displacement variation V(t) at timing (5) meets the second threshold value C2 or C2', indicating that the angular measurement has been reached to a defined convergence range, then the light source emits a maximum light intensity I(5) at this time.

In another embodiment shown in FIGS. 1F and 5 of the present invention, the illumination intensity I(t) of the LED light source unit 1060 corresponds to the change of the amplitude X(t) or displacement variation V(t) over time, and the LED light source unit 1060 emits a light to illuminate the bubble tube 106 at arbitrary angle or 90 degrees, similar to those of the aforementioned 0 degree example.

Figure 6:
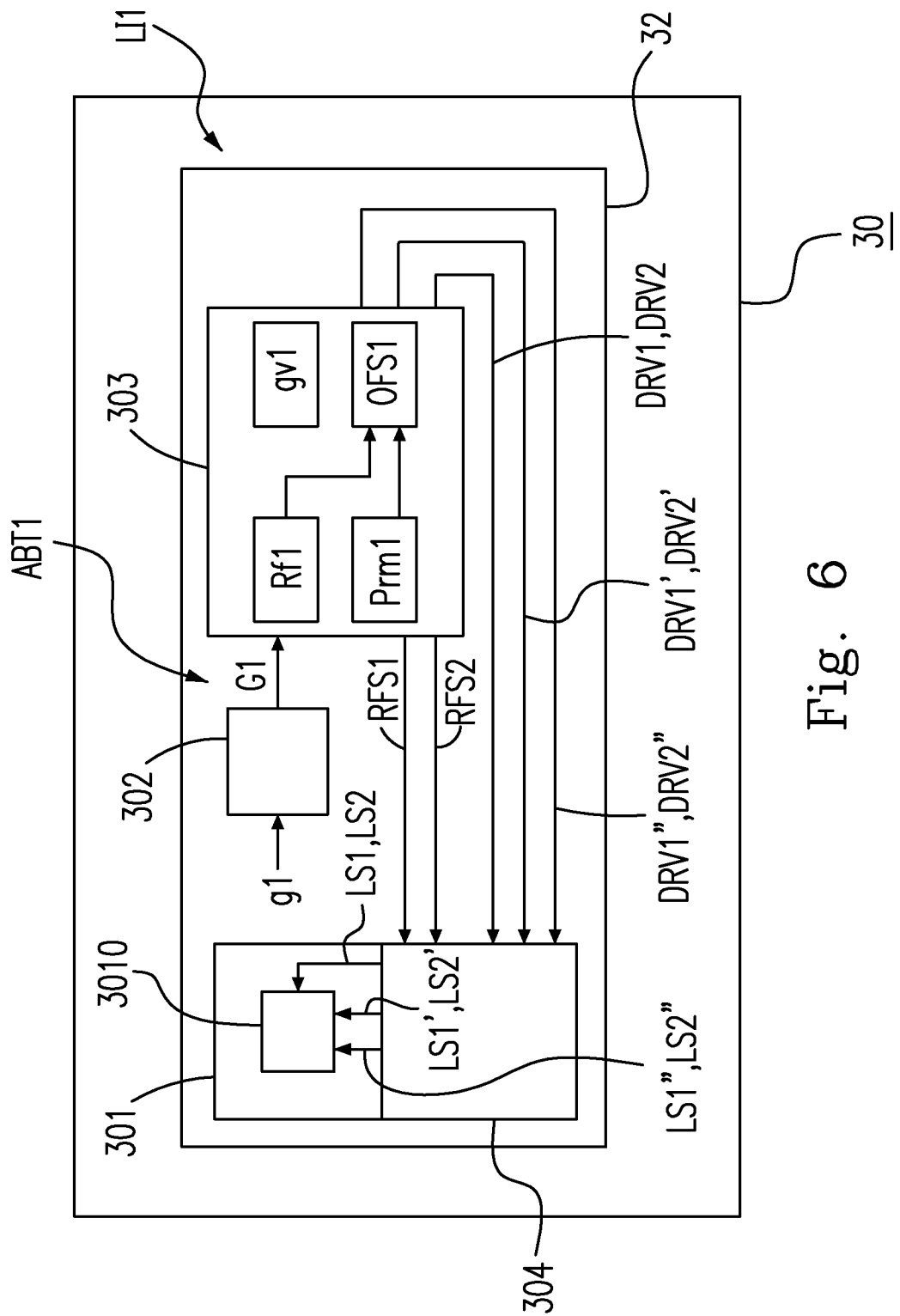
FIG. 6 is a schematic diagram showing a surface slope measuring device according to a preferred embodiment of the present disclosure.

Please refer to FIG. 6, which is a schematic diagram showing a surface slope measuring device 30 according to a preferred embodiment of the present disclosure. The surface slope measuring device 30 includes a device body 32, a gravity sensing unit 302, a processing unit 303 and a light source unit 304. The processing unit 303 is coupled to the device body 32, the gravity sensing unit 302 and the light source unit 304. The device body 32 has a tilt angle θ1 relative to an absolute horizontal plane AHS1 (please refer to FIG. 1F) and associated with a gravity g1. When the tilt angle θ1 is measured, the mass 201 in the gravity sensing unit 302 as shown in FIG. 2 will be displaced to a new equilibrium position $X_O$ according to the gravity g1 associated with the tilt angle θ1. In the process of moving from the original equilibrium position $X_R$ to the new equilibrium position $X_O$, because the mass block 201 is subjected to the elastic force of the spring 202, a reciprocal motion or an oscillation of the mass block 201 occurs with respect to the new equilibrium position $X_O$, i.e., a plurality of motion amplitudes of the oscillation occur. The damper 203 dissipates the kinetic energy of the mass block 201 in osscilation, the amplitudes of the oscillation gradually become smaller and convergent until the mass block 201 is theoretically stationary at the new equilibrium position $X_O$. During the convergence process of the oscillation, the gravity sensor 302 correspondingly generates a plurality of gravity response signals G1 due to the plurality of motion amplitudes generated by the mass block 201. The processing unit 303 is electrically connected to the gravity sensing unit 302, converts the plurality of gravity response signals G1 into a plurality of parameter values Pm1, and compares the plurality of parameter values Pm1 with a reference value Rf1 one by one to obtain a specific offset value OFS1. The light source unit 304 has a characteristic being proportionally related to the specific offset value OFS1. For example, the light source unit 304, in response to the specific offset value OFS1, emits an optical signal LS1, wherein the light intensity of the optical signal LS1 is inversely proportional to the specific offset value OFS1.

In FIG. 6, the surface slope measuring device 30 further includes a bubble tube 301 containing a bubble 3010, which is used to reflect or indicate the tilt angle θ1 of the bubble tube 301 with respect to the absolute horizontal plane AHS1, wherein the tilt angle is associated with the gravity g1. The surface slope measuring device 30 can be a bubble tube device ABT1, or a level LI1 formed by the bubble tube device ABT1 and the device body 32, wherein the bubble tube device ABT1 includes the bubble tube 301, the gravity sensing unit 302, the processing unit 303 and the light source unit 304. The level LI1 can be portable for measuring the tilt angle θ1, and the device body 32 can be embedded into other equipment, devices, instruments and tools to indicate a measured angles. The plurality of parameter values Pm1 can be a plurality of gravity values gv1 corresponding to the convergent amplitudes X(t) of the mass block 201, and the processing unit 303 sets a first threshold value (C1 or C1') and a second threshold value (C2 or C2') for the plurality of gravity values gv1, wherein the first threshold value (C1 or C1') is greater than the second threshold value (C2 or C2'). The processing unit 303 uses a correlation algorithm to associate the plurality of gravity response signals G1 with a driving signal (DRV1 or DRV2), and the light source unit 304 emits the optical signal (LS1 or LS2) according to the driving signal (DRV1 or DRV2).

Please refer to FIG. 3A and FIG. 6, the processing unit 303 provides a reference signal RFS1, and converts the reference signal RFS1 to the PWM signal according to at least one of the absolute change value XMa, the relative change value XMr and the relative variation value VMr. The processing unit 303 provides a reference signal RFS2, and converts the reference signal RFS2 to the PDM signal according to at least one of the absolute change value XMa, the relative change value XMr and the relative variation value VMr. The correlation algorithm is described as follows (but not limited to): when a first one of the plurality of gravity values gv1 (for example, the variant value V(t1) as shown in FIG. 3A) is less than the first threshold value C1', an initial driving signal (DRV1' or DRV2') of the driving signal (DRV1 or DRV2) starts to drive the light source unit 304, and causes the light source unit 304 to emit the optical signal (LS1' or LS2') having one of a relatively lower intensity and a relatively warmer color, wherein the initial driving signal (DRV1' or DRV2') is one of a pulse width modulation (PWM) signal DRV1' having a relatively small duty cycle and a relatively rare pulse density modulation (PDM) signal DRV2'. As the oscillation proceeds, the plurality of motion amplitudes become gradually smaller, the duty cycle of the PWM signal DRV1' or the ratio of the total pulse time with respect to the cycle period of the PDM signal DRV2' becomes gradually larger, causing the light source unit 304 to emit a light signal (LS1' or LS2') having a relatively gradual increasing light intensity or a relatively gradual high frequency white color. When a second one of the plurality of gravity variability values gv1 (for example, the variant value V(t) where t is about 9 unit as shown in FIG. 3A) is less than the second threshold value C2', a lasting driving signal (DRV1" or DRV2") of the driving signal (DRV1 or DRV2) starts to emit the optical signal (LS1" or LS2") having one of a relatively higher intensity and a relatively colder color, i.e., the lasting driving signal (DRV1" or DRV2") is one of a PWM signal DRV1" having a relatively large duty cycle and a relatively dense PDM signal DRV2". The optical signal (LS1 or LS2) has an optical frequency including one of a single optical frequency and a mixed optical frequency, wherein the single optical frequency is related to a light intensity, and the mixed optical frequency is formed by blending a plurality of optical frequencies of three primary colors of light. The light source unit 304 includes one of a single color LED and a full color LED with three primary colors of red, blue and yellow.

Please refer to FIGS. 2 and 6, the gravity sensing unit 302 senses the gravity g1 over time to generate the plurality of gravity response signals G1. The processing unit 303 analyzes a convergence state of the plurality of gravity values gv1. The gravity sensing unit 302 includes a proof mass unit (as the mass block 201 having the proof mass M1 in FIG. 2), a spring 202 having elastic coefficient K1 and a damper 203 having a damping coefficient CX1. When the gravity sensing unit 302 measures the tilt angle θ1, the proof mass unit, i.e., the mass block 201, generates an oscillatory motion having an amplitude X(t), and the plurality of gravity value gv1 depend on the change of the amplitude X(t) over time. The convergence state is formed by the convergence of the plurality of gravity values gv1, which is caused by the convergence of the amplitude X(t) over time due to the damper 203. The processing unit 303 increases the duty cycle of the PWM signal of the driving signal DRV1 or makes the PDM signal of the driving signal DRV2 denser in response to convergence of the plurality of gravity values gv1. The light source 304 makes the light intensity of the optical signal LS1 approach a specific light intensity in response to an increasingly larger duty cycle of the PWM signal, or makes the light frequency of the optical signal LS2 approach a specific light frequency in response to an increasingly denser pulse of the PDM signal.

Please refer to FIG. 7, which is a schematic diagram showing a surface slope measuring method S10 according to a preferred embodiment of the present disclosure. Step S101, providing a gravity sensing unit to sense a tilt angle of a bubble tube device to generate at least one of a plurality of gravity signals as a function of time, a plurality of amplitude signals and a plurality of displacement signals. Step S102, processing at least one of the plurality of gravity signals as a function of time, the plurality of amplitude signals and the plurality of displacement signals to generate at least one of a plurality of gravity variant values, a plurality of amplitude variant values and a plurality of displacement variant values, wherein at least one of the plurality of gravity variant values, the plurality of amplitude variant values and the plurality of displacement variant values indicate a convergence state. Step S103, generating a variant correlation driving signal depending on the convergence state according to at least one of the plurality of gravity variant values, the plurality of amplitude variant values and the plurality of displacement variant values. Step S104, emitting an optical signal having one of a specific light intensity and a specific light frequency in response to the variant correlation driving signal. Step S105, indicating the tilt angle according to one of the light intensity and the light frequency.

Please refer to FIG. 8, which is a schematic diagram showing another surface slope measuring method S20 according to a preferred embodiment of the present disclosure. Step S201, placing a device body with a tilt angle relative to an absolute horizontal plane and associated with a gravity. Step S202, generating a plurality of gravity response signals respectively corresponding to a plurality of angles readouts upon sensing the tilt angle. Step S203, comparing each of the plurality of gravity response signals with a reference signal one by one to obtain a respective deviation comparison signal. Step S204, emitting an optical signal having a parameter, according to a magnitude of the respective deviation comparison signal, wherein the parameter and the magnitude have a mathematical relationship therebetween.

EMBODIMENTS

1. A surface slope measuring device comprises a frame and a bubble tube device. The frame has at least one flat surface for contacting a surface to be measured, and the bubble tube device is coupled to the frame, and comprising a gravity sensing unit, a bubble tube unit, a processing unit and a light source. The gravity sensing unit senses a metric angle of the measured surface to generate a gravity response signal. The bubble tube unit comprises a transparent tube including a liquid, and a bubble having a position reflecting the metric angle. The processing unit is electrically connected to the gravity sensing unit, processes the gravity response signal to generate a gravity value having a variation value, and processes the gravity value by using a correlation algorithm to output a driving signal according to the variation value. The light source unit is disposed near the bubble tube unit, and emits an optical signal to illuminate the bubble tube unit according to the driving signal.

2. The measuring device in Embodiment 1, wherein the driving signal includes at least one of a Pulse Width Modulation (PWM) signal, a Pulse Density Modulation (PDM) signal, a plurality of PWM signals for forming three primary colors of light, and a plurality of PDM signals for forming the three primary colors of light.

3. The measuring device of any one of Embodiments 1-2, wherein the optical signal includes one of a single optical frequency and a mixed optical frequency, wherein the single optical frequency is related to a light intensity, and the mixed optical frequency is mixed from the optical frequencies of three primary colors of light.

4. The measuring device of any one of Embodiments 1-3, wherein the measuring device is a level, and the light source unit comprises one of a single color LED and a full color LED with three primary colors of red, blue and yellow.

5. The measuring device of any one of Embodiments 1-4, wherein the processing unit processes the gravity response signal by using an angle algorithm to generate an angle signal.

6. The measuring device of any one of Embodiments 1-5, wherein the variation value includes at least one of an absolute change value, a relative change value and a relative variation value obtained by statistical means, and the driving signal includes at least one of a pulse width modulation (PWM) signal and a pulse density modulation (PDM) signal.

7. The measuring device of any one of Embodiments 1-6, wherein the correlation algorithm includes one of the following methodologies: the processing unit provides a reference signal, and converts the reference signal to the PWM signal according to at least one of the absolute change value, the relative change value and the relative variation value; and the processing unit provides the reference signal, and converts the reference signal into the PDM signal according to at least one of the absolute change value, the relative change value and the relative variation value.

8. The measuring device of any one of Embodiments 1-7, wherein one of the PWM signal and the PDM signal drives a single color LED to emit the optical signal as a monochromatic light, and a light intensity of the monochromatic light is related to at least one of the absolute change value, the relative change value and the relative variation value; one of the PWM signal and the PDM signal drives a full-color LED to emit the optical signal as a colored light, and a characteristic frequency band of the colored light is related to at least one of the absolute change value, the relative change value and the relative variation value; and the variation value is inversely proportional to the intensity of the monochromatic light.

9. A method for identifying a surface slope, comprising steps of: placing a device body with a tilt angle relative to an absolute horizontal plane and associated with a gravity; generating a plurality of gravity response signals respectively corresponding to a plurality of angles readouts upon sensing the tilt angle; comparing each of the plurality of gravity response signals with a reference signal one by one to obtain a respective deviation comparison signal; and emitting an optical signal having a parameter, according to a magnitude of the respective deviation comparison signal wherein the parameter and the magnitude have a mathematical relationship therebetween.

10. The method in Embodiment 9, wherein the device body is a bubble tube device, the parameter is one of a light intensity and a specific optical frequency and the method further comprises the following steps of: providing a gravity sensing unit for sensing the tilt angle wherein the plurality of gravity response signals change with time; processing the plurality of gravity response signals to generate a plurality of gravity variability values representative of a convergence state of the plurality of gravity response signals; generating a variant correlated driving signal depending on the convergence state according to the plurality of gravity variability values; emitting the optical signal according to the variant correlated driving signal; and indicating the tilt angle by the parameter.

11. The method of any one of Embodiments 9-10, further comprising the following steps of: processing the plurality of gravity response signals to generate a plurality of gravity variability values; and setting a first threshold value and a second threshold value for the plurality of gravity variability value, wherein the first threshold value is greater than the second threshold value.

12. The method of any one of Embodiments 9-11, further comprising the following step of: when a first one of the plurality of gravity variability values is less than the first threshold value, starting to generate the optical signal having one of a relatively lower intensity and a relatively warmer color according to a first variation correlation driving signal, which is one of a pulse width modulation (PWM) signal having a relatively small duty cycle and a relatively rare pulse density modulation (PDM) signal; and when a second one of the plurality of gravity variability values is less than the second threshold value, starting to generate the optical signal having one of a relatively higher intensity and a relatively colder color according to a second variation correlation driving signal, which is one of a pulse width modulation (PWM) signal having a relatively large duty cycle and a relatively dense pulse density modulation (PDM) signal.

13. The method of any one of Embodiments 9-12, wherein the variant correlated driving signal includes one of a pulse width modulation (PWM) signal and a pulse density modulation (PDM) signal, the gravity sensing unit includes a proof mass unit having a mass effect, a spring being an elastic element having a kinetic energy and potential energy interaction effect, and one of a damper and a damping element having a damping effect.

14. The method of any one of Embodiments 9-13, further comprising the following steps of: when the gravity sensing unit measures the tilt angle, causing the proof mass unit to generate an oscillatory motion having an amplitude, wherein the plurality of gravity variability values are dependent on the amplitude changed over time; causing the plurality of gravity variability values to converge in response to a convergence of the amplitude with time; causing a duty ratio of the PWM signal to increase, or a density of the PDM signal to be denser, in response to a convergence of the plurality of gravity variability values; and causing the light intensity to approach a specific light intensity in response to the duty ratio of the PWM signal to be larger, or causing the optical frequency of the optical signal to approach a specific optical frequency in response to the density of the PDM signal to be denser.

15. A surface slope measuring device comprises a device body, a gravity sensing unit, a processing unit and a light source unit. The device body has a tilt angle relative to an absolute horizontal plane and associated with a gravity. The gravity sensing unit generates a plurality of gravity response signals respectively corresponding to a plurality of angles readouts upon sensing the tilt angle. The processing unit is electrically connected to the gravity sensing unit, converts the plurality of gravity response signals into a plurality of parameter values, and compares each of the plurality of parameter values with a reference value one by one to obtain a respective deviation comparison value. The light source unit emits an optical signal having a signal parameter according to the respective deviation comparison value wherein the signal parameter and the respective deviation comparison value have a proportional relationship therebetween.

16. The measuring device in Embodiments 15, wherein the measuring device further includes a bubble tube containing a bubble having a position reflecting the tilt angle of the bubble tube relative to the absolute horizontal plane, wherein the tilt angle is associated with the gravity; the measuring device is a bubble tube device; the plurality of parameter values are a plurality of gravity values; and the processing unit sets a first threshold value and a second threshold value for the plurality of gravity values, wherein the first threshold value is greater than the second threshold value.

17. The measuring device of any one of Embodiments 15-16, wherein the processing unit uses a correlated algorithm to associate the plurality of gravity response signals with a driving signal, and the light source unit emits the optical signal according to the driving signal; the correlated algorithm includes: when a first one of the plurality of gravity values is less than the first threshold value, a first driving signal of the driving signal starts to drive the light source unit, and causes the light source unit to emit the optical signal having one of a relatively lower intensity and a relatively warmer color, wherein the first driving signal is one of a pulse width modulation (PWM) signal having a relatively small duty cycle and a relatively rare pulse density modulation (PDM) signal; and when a second one of the plurality of gravity variability values is less than the second threshold value, a second driving signal of the driving signal starts to emit the optical signal having one of a relatively higher intensity and a relatively colder color, wherein the second driving signal is one of a pulse width modulation (PWM) signal having a relatively large duty cycle and a relatively dense pulse density modulation (PDM) signal.

18. The measuring device of any one of Embodiments 15-17, wherein the driving signal includes at least one of a Pulse Width Modulation (PWM) signal, a Pulse Density Modulation (PDM) signal, a plurality of PWM signals for forming three primary colors of light, and a plurality of PDM signals for forming the three primary colors of light; and the optical signal has an optical frequency including one of a single optical frequency and a mixed optical frequency, wherein the single optical frequency is related to a light intensity, and the mixed optical frequency is formed by blending a plurality of optical frequencies of three primary colors of light.

19. The measuring device of any one of Embodiments 15-18, wherein the light source unit comprises one of a single color LED and a full color LED with three primary colors of red, blue and yellow; the gravity sensing unit senses the gravity over time to generate the plurality of gravity response signals; the plurality of parameter values are a plurality of gravity values; and the processing unit analyzes a convergence state of the plurality of gravity values.

20. The measuring device of any one of Embodiments 15-19, wherein the gravity sensing unit includes a proof mass unit, a spring and a damper; when the gravity sensing unit measures the tilt angle, the proof mass unit generates an oscillatory motion having an amplitude, wherein the plurality of gravity values depend on the amplitude changed over time; the convergence state includes a condition that the damper causes the amplitude to converge with time to result in a convergence of the plurality of gravity values; the processing unit causes a duty ratio of a PWM signal to increase, or a density of a PDM signal to be denser, in response to the convergence of the plurality of gravity values; the processing unit causes a duty ratio of the PWM signal to increase, or a density of the PDM signal to be denser, in response to the convergence of the plurality of gravity values; and the light source unit causes a light intensity of the optical signal to approach a specific light intensity in response to the duty ratio of the PWM signal to be larger, or causes an optical frequency of the optical signal to approach a specific optical frequency in response to the density of the PDM signal to be denser.

While the invention has been described in terms of what is presently considered to be the most practical and preferred embodiments, it is to be understood that the invention need not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A surface slope measuring device, comprising:
    a frame having at least one flat surface for contacting a surface to be measured; and
    a bubble tube device coupled to the frame, and comprising:
        a gravity sensing unit sensing a metric angle of the measured surface to generate a gravity response signal;
        a bubble tube unit comprising a transparent tube including a liquid, and a bubble having a position reflecting the metric angle;
        a processing unit electrically connected to the gravity sensing unit, processing the gravity response signal to generate a gravity value having a variation value, and processing the gravity value by using a correlation algorithm to output a driving signal according to the variation value; and
        a light source unit disposed near the bubble tube unit, and emitting an optical signal to illuminate the bubble tube unit according to the driving signal.

2. The surface slope measuring device as claimed in claim 1, wherein:
    the driving signal includes at least one of a Pulse Width Modulation (PWM) signal, a Pulse Density Modulation (PDM) signal, a plurality of PWM signals for forming three primary colors of light, and a plurality of PDM signals for forming the three primary colors of light.

3. The surface slope measuring device as claimed in claim 1, wherein:
    the optical signal includes one of a single optical frequency and a mixed optical frequency, wherein the single optical frequency is related to a light intensity, and the mixed optical frequency is mixed from the optical frequencies of three primary colors of light.

4. The surface slope measuring device as claimed in claim 1, wherein:
    the measuring device is a level; and
    the light source unit comprises one of a single color LED and a full color LED with three primary colors of red, blue and yellow.

5. The surface slope measuring device as claimed in claim 1, wherein the processing unit processes the gravity response signal by using an angle algorithm to generate an angle signal.

6. The surface slope measuring device as claimed in claim 1, wherein:
    the variation value includes at least one of an absolute change value, a relative change value and a statistical variation value obtained by statistical means; and
    the driving signal includes at least one of a pulse width modulation (PWM) signal and a pulse density modulation (PDM) signal.

7. The surface slope measuring device as claimed in claim 6, wherein the correlation algorithm includes one of the following methodologies:
    the processing unit provides a reference signal, and converts the reference signal to the PWM signal according to at least one of the absolute change value, the relative change value and the statistical variation value; and
    the processing unit provides the reference signal, and converts the reference signal into the PDM signal according to at least one of the absolute change value, the relative change value and the statistical variation value.

8. The surface slope measuring device as claimed in claim 6, wherein:
    one of the PWM signal and the PDM signal drives a single color LED to emit the optical signal as a monochromatic light, and a light intensity of the monochromatic light is related to at least one of the absolute change value, the relative change value and the statistical variation value;
    one of the PWM signal and the PDM signal drives a full-color LED to emit the optical signal as a colored light, and a characteristic frequency band of the colored light is related to at least one of the absolute change value, the relative change value and the statistical variation value; and
    the variation value is inversely proportional to the intensity of the monochromatic light.

9. A method for identifying a surface slope, comprising steps of:
    placing a device body with a tilt angle relative to an absolute horizontal plane and associated with a gravity;
    generating a plurality of gravity response signals respectively corresponding to a plurality of angles readouts upon sensing the tilt angle;

comparing each of the plurality of gravity response signals with a reference signal one by one to obtain a respective deviation comparison signal; and emitting an optical signal having a parameter, according to a magnitude of the respective deviation comparison signal wherein the parameter and the magnitude have a mathematical relationship therebetween.

10. The method as claimed in claim 9, wherein the device body is a bubble tube device, the parameter is one of a light intensity and a specific optical frequency, and the method further comprises the following steps of:

providing a gravity sensing unit for sensing the tilt angle wherein the plurality of gravity response signals change with time;

processing the plurality of gravity response signals to generate a plurality of gravity variability values representative of a convergence state of the plurality of gravity response signals;

generating a variant correlated driving signal depending on the convergence state according to the plurality of gravity variability values;

emitting the optical signal according to the variant correlated driving signal; and indicating the tilt angle by the parameter.

11. The method as claimed in claim 9, further comprising the following steps of:

processing the plurality of gravity response signals to generate a plurality of gravity variability values; and setting a first threshold value and a second threshold value for the plurality of gravity variability value, wherein the first threshold value is greater than the second threshold value.

12. The method as claimed in claim 11, further comprising the following steps of:

when a first one of the plurality of gravity variability values is less than the first threshold value, starting to generate the optical signal having one of a relatively lower intensity and a relatively warmer color according to a first variation correlation driving signal, which is one of a pulse width modulation (PWM) signal having a relatively small duty cycle and a relatively rare pulse density modulation (PDM) signal; and when a second one of the plurality of gravity variability values is less than the second threshold value, starting to generate the optical signal having one of a relatively higher intensity and a relatively colder color according to a second variation correlation driving signal, which is one of a pulse width modulation (PWM) signal having a relatively large duty cycle and a relatively dense pulse density modulation (PDM) signal.

13. The method as claimed in claim 10, wherein the variant correlated driving signal includes one of a pulse width modulation (PWM) signal and a pulse density modulation (PDM) signal, the gravity sensing unit includes a proof mass unit having a mass effect, a spring being an elastic element having a kinetic energy and potential energy interaction effect, and one of a damper and a damping element having a damping effect.

14. The method as claimed in claim 13, further comprising the following steps of:

when the gravity sensing unit measures the tilt angle, causing the proof mass unit to generate an oscillatory motion having an amplitude, wherein the plurality of gravity variability values are dependent on the amplitude changed over time;

causing the plurality of gravity variability values to converge in response to a convergence of the amplitude with time;

causing a duty ratio of the PWM signal to increase, or a density of the PDM signal to be denser, in response to a convergence of the plurality of gravity variability values; and causing the light intensity to approach a specific light intensity in response to the duty ratio of the PWM signal to be larger, or causing the optical frequency of the optical signal to approach a specific optical frequency in response to the density of the PDM signal to be denser.

15. A surface slope measuring device, comprising:

a device body having a tilt angle relative to an absolute horizontal plane and associated with a gravity;

a gravity sensing unit generating a plurality of gravity response signals respectively corresponding to a plurality of angles readouts upon sensing the tilt angle;

a processing unit electrically connected to the gravity sensing unit, converting the plurality of gravity response signals into a plurality of parameter values, and comparing each of the plurality of parameter values with a reference value one by one to obtain a respective deviation comparison value; and a light source unit emitting an optical signal having a signal parameter according to the respective deviation comparison value wherein the signal parameter and the respective deviation comparison value have a proportional relationship therebetween.

16. The surface slope measuring device as claimed in claim 15, wherein:

the measuring device further includes a bubble tube containing a bubble having a position reflecting the tilt angle of the bubble tube relative to the absolute horizontal plane, wherein the tilt angle is associated with the gravity;

the measuring device is a bubble tube device;

the plurality of parameter values are a plurality of gravity values; and the processing unit sets a first threshold value and a second threshold value for the plurality of gravity values, wherein the first threshold value is greater than the second threshold value.

17. The surface slope measuring device as claimed in claim 15, wherein:

the processing unit uses a correlated algorithm to associate the plurality of gravity response signals with a driving signal, and the light source unit emits the optical signal according to the driving signal;

the correlated algorithm includes:

when a first one of the plurality of gravity values is less than the first threshold value, a first driving signal of the driving signal starts to drive the light source unit, and causes the light source unit to emit the optical signal having one of a relatively lower intensity and a relatively warmer color, wherein the first driving signal is one of a pulse width modulation (PWM) signal having a relatively small duty cycle and a relatively rare pulse density modulation (PDM) signal; and when a second one of the plurality of gravity variability values is less than the second threshold value, a second driving signal of the driving signal starts to emit the optical signal having one of a relatively higher intensity and a relatively colder color, wherein the second driving signal is one of a pulse width modulation (PWM) signal having a relatively large duty cycle and a relatively dense pulse density modulation (PDM) signal.

18. The surface slope measuring device as claimed in claim 15, wherein:
the driving signal includes at least one of a Pulse Width Modulation (PWM) signal, a Pulse Density Modulation (PDM) signal, a plurality of PWM signals for forming three primary colors of light, and a plurality of PDM signals for forming the three primary colors of light; and
the optical signal has an optical frequency including one of a single optical frequency and a mixed optical frequency, wherein the single optical frequency is related to a light intensity, and the mixed optical frequency is formed by blending a plurality of optical frequencies of three primary colors of light.

19. The surface slope measuring device as claimed in claim 15, wherein:
the light source unit comprises one of a single color LED and a full color LED with three primary colors of red, blue and yellow;
the gravity sensing unit senses the gravity over time to generate the plurality of gravity response signals;
the plurality of parameter values are a plurality of gravity values; and
the processing unit analyzes a convergence state of the plurality of gravity values.

20. The surface slope measuring device as claimed in claim 19, wherein:
the gravity sensing unit includes a proof mass unit, a spring and a damper;
when the gravity sensing unit measures the tilt angle, the proof mass unit generates an oscillatory motion having an amplitude, wherein the plurality of gravity values depend on the amplitude changed over time;
the convergence state includes a condition that the damper causes the amplitude to converge with time to result in a convergence of the plurality of gravity values;
the processing unit causes a duty ratio of a PWM signal to increase, or a density of a PDM signal to be denser, in response to the convergence of the plurality of gravity values;
the processing unit causes a duty ratio of the PWM signal to increase, or a density of the PDM signal to be denser, in response to the convergence of the plurality of gravity values; and
the light source unit causes a light intensity of the optical signal to approach a specific light intensity in response to the duty ratio of the PWM signal to be larger, or causes an optical frequency of the optical signal to approach a specific optical frequency in response to the density of the PDM signal to be denser.

* * * * *